US012730909B2

(12) United States Patent
Chen et al.

(10) Patent No.: US 12,730,909 B2
(45) Date of Patent: Sep. 8, 2026

(54) ACCESS CONTROL METHOD AND RELATED APPARATUS

(71) Applicant: Huawei Technologies Co., Ltd., Shenzhen (CN)

(72) Inventors: Xiaodong Chen, Beijing (CN); Changting Li, Beijing (CN); Shengtao Zhang, Beijing (CN); Guojian Zhao, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 190 days.

(21) Appl. No.: 18/398,325

(22) Filed: Dec. 28, 2023

(65) Prior Publication Data

US 2024/0126897 A1 Apr. 18, 2024

Related U.S. Application Data

(63) Continuation of application No. PCT/CN2022/100826, filed on Jun. 23, 2022.

(30) Foreign Application Priority Data

Jun. 29, 2021 (CN) ......................... 202110742228.8

(51) Int. Cl.

| | |
|---|---|
| ***G06F 21/60*** | (2013.01) |
| ***G06F 21/32*** | (2013.01) |
| ***G06F 21/57*** | (2013.01) |
| ***G06V 40/16*** | (2022.01) |
| ***G06V 40/20*** | (2022.01) |

(52) U.S. Cl.
CPC ............ *G06F 21/604* (2013.01); *G06F 21/32* (2013.01); *G06F 21/577* (2013.01); *G06V 40/174* (2022.01); *G06V 40/28* (2022.01); *G06F 2221/2141* (2013.01); *G06F 2221/2149* (2013.01)

(58) Field of Classification Search
CPC ...... G06F 21/604; G06F 21/32; G06F 21/577; G06V 40/174; G06V 40/28
See application file for complete search history.

(56) References Cited

U.S. PATENT DOCUMENTS

| | | | | |
|---|---|---|---|---|
| 9,027,117 | B2 * | 5/2015 | Wilairat .................. | G06F 21/36 726/17 |
| 9,104,886 | B1 * | 8/2015 | Dolbakian .............. | G06F 21/62 |
| 9,665,702 | B2 * | 5/2017 | King ..................... | H04W 12/37 |
| 2010/0024016 | A1 | 1/2010 | Violleau et al. | |
| 2010/0024028 | A1 * | 1/2010 | Baugher ................ | H04M 1/66 726/17 |

(Continued)

FOREIGN PATENT DOCUMENTS

| | | |
|---|---|---|
| CN | 102087585 A | 6/2011 |
| CN | 104169857 A | 11/2014 |

(Continued)

*Primary Examiner* — Shanto Abedin
(74) *Attorney, Agent, or Firm* — Slater Matsil, LLP

(57) ABSTRACT

After an electronic device in a locked state obtains an operation instruction and identity authentication information that does not meet an unlocking requirement, the electronic device may determine whether to allow access to a resource that the operation instruction requests to access, and if yes, access the corresponding resource in response to the operation instruction.

20 Claims, 15 Drawing Sheets

(56) References Cited

U.S. PATENT DOCUMENTS

| | | | | |
|---|---|---|---|---|
| 2011/0231914 | A1* | 9/2011 | Hung | H04W 12/30 726/7 |
| 2012/0015629 | A1* | 1/2012 | Olsen | H04M 1/724634 455/411 |
| 2012/0154413 | A1 | 6/2012 | Kim et al. | |
| 2013/0305354 | A1* | 11/2013 | King | G06F 21/629 726/19 |
| 2014/0068755 | A1* | 3/2014 | King | G06F 3/04883 726/19 |
| 2014/0115695 | A1* | 4/2014 | Fadell | H04L 9/3231 726/19 |
| 2016/0314308 | A1* | 10/2016 | Suzuki | H04M 1/724634 |
| 2017/0026308 | A1* | 1/2017 | Reagan | H04L 47/70 |
| 2018/0352440 | A1* | 12/2018 | Ballard | H04L 9/3231 |
| 2019/0026464 | A1* | 1/2019 | Nalluri | G06F 21/563 |
| 2019/0342298 | A1* | 11/2019 | Chen | H04L 9/3231 |
| 2020/0389460 | A1* | 12/2020 | Carbune | H04L 67/306 |

FOREIGN PATENT DOCUMENTS

| | | | |
|---|---|---|---|
| CN | 105100281 | A | 11/2015 |
| CN | 106231073 | A | 12/2016 |
| CN | 106572261 | A | 4/2017 |
| CN | 106959841 | A | 7/2017 |
| CN | 107612880 | A | 1/2018 |
| CN | 110381195 | A | 10/2019 |
| WO | 2015073413 | A1 | 5/2015 |

* cited by examiner

Graphical user interface 53

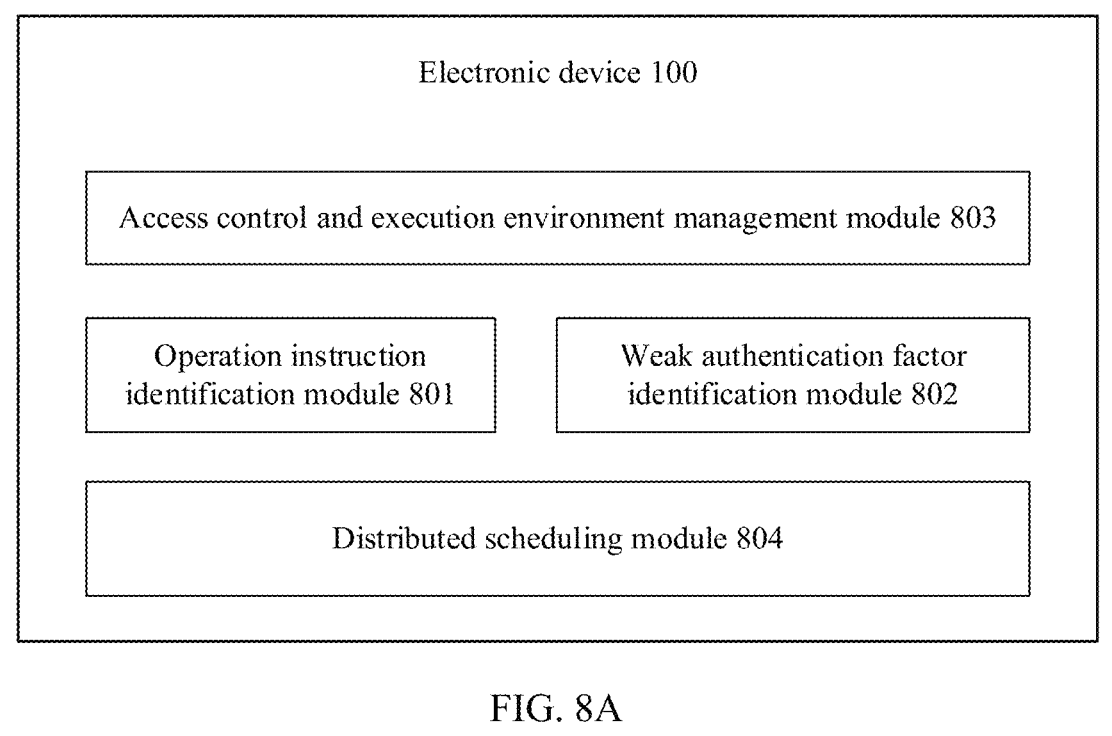

Electronic device 100

Access control and execution environment management module 803

Operation instruction identification module 801

Weak authentication factor identification module 802

Distributed scheduling module 804

FIG. 8A

ACCESS CONTROL METHOD AND RELATED APPARATUS

CROSS-REFERENCE TO RELATED APPLICATIONS

This application is a continuation of International Application No. PCT/CN2022/100826, filed on Jun. 23, 2022, which claims priority to Chinese Patent Application No. 202110742228.8, filed on Jun. 29, 2021. The disclosures of the aforementioned applications are hereby incorporated by reference in their entireties.

TECHNICAL FIELD

This application relates to the field of terminal and identity authentication technologies, and in particular, to an access control method and a related apparatus.

BACKGROUND

To ensure security and avoid misoperations, a locked state may be set for electronic devices such as a computer and a mobile phone. When the electronic device is in the locked state, a user needs to input predefined identity authentication information, for example, a preset fingerprint, a face, or a password, so that the electronic device can be unlocked and enter an unlocked state. Most functions of the electronic device can be invoked only in the unlocked state.

Currently, the user needs to input accurate identity authentication information, for example, a close face or a fingerprint that is completely the same as a preset fingerprint, to trigger unlocking of the electronic device. In addition, the user cannot unlock the device through some authentication modes with low precision, for example, voiceprint authentication. As a result, the user needs to perform a complex authentication operation or even a plurality of authentication operations to unlock the device, which makes the use of the electronic device less convenient.

SUMMARY

This application provides an access control method and a related apparatus, so that a user can easily and conveniently control an electronic device without performing complex authentication to unlock the electronic device.

According to a first aspect, an embodiment of this application provides a weak authentication factor-based access control method, including: A first device in a locked state obtains a first operation instruction and a first authentication factor, where the first operation instruction is used to request to access a first resource of the first device, the first authentication factor includes identity authentication information that does not meet an unlocking requirement of the first device, and identity authentication information that meets the unlocking requirement of the first device is used to switch the first device from the locked state to an unlocked state; the first device determines, based on the first operation instruction and the first authentication factor, resources that the first device is allowed to access; and if the resources that the first device is allowed to access include the first resource, the first device accesses the first resource in response to the first operation instruction.

According to the method provided in the first aspect, an electronic device no longer determines, only based on whether the electronic device is unlocked, whether to respond to and perform a corresponding operation, and may implement finer-grained access control for various types of resources based on an operation instruction and a weak authentication factor, thereby enriching use scenarios and use scopes of the electronic device. For a user, the electronic device may be triggered to perform some operations without performing complex authentication to unlock the electronic device, so that the user can control the electronic device more easily and conveniently.

With reference to the first aspect, in some implementations, the first device may determine, based on a risk level of accessing the first resource, the resources that the first device is allowed to access, where if the risk level of accessing the first resource is higher, the first device is allowed to access fewer resources. If privacy of the first resource is higher, the risk level of accessing the first resource is higher. In this way, a resource access risk can be fully considered to avoid data leakage and the like.

With reference to the first aspect, in some implementations, the first device may determine, based on a security level of the first authentication factor, the resources that the first device is allowed to access, where if the security level of the first authentication factor is lower, the first device is allowed to access fewer resources. If an authentication capability level (ACL) of an identity authentication mode corresponding to the first authentication factor is higher, or a matching degree between the first authentication factor and the identity authentication information that meets the unlocking requirement of the first device is higher, the security level of the first authentication factor is higher. In this way, reliability of a current authentication factor can be fully considered to avoid data leakage and the like.

With reference to the first aspect, in some implementations, the first resource includes a resource that is predefined as inaccessible to the first device in the locked state. Herein, a resource accessible in the locked state is a basic resource or a common resource, for example, a camera application, a flashlight, or Bluetooth. A resource inaccessible in the locked state may include a resource related to user privacy data, for example, a photo or a browsing history. The resource accessible in the locked state may be predefined by the first device.

With reference to the first aspect, in some implementations, the first operation instruction includes any one of the following: semantics carried in a voice, a gesture, a facial expression, and a body posture.

With reference to the first aspect, in some implementations, the first device may obtain the first operation instruction in any one of the following manners:

- the first device captures a voice or an image, and identifies the first operation instruction carried in the voice or the image;
- the first device receives a voice or an image sent by a second device, and identifies the first operation instruction carried in the voice or the image; or
- the first device receives the first operation instruction sent by a second device.

With reference to the first aspect, in some implementations, the identity authentication information includes any one or more of the following: password, graph, or biometric feature. Biometric features are classified into two types: a body feature and a behavior feature. The body feature includes face, voiceprint, fingerprint, palm type, retina, iris, body odor, face type, heart rate, and deoxyribonucleic acid (DNA). The behavior feature includes signature, body posture (for example, walking gait), and the like.

With reference to the first aspect, in some implementations, the identity authentication information that does not meet the unlocking requirement of the first device may include any one or more of the following:

1. Identity authentication information that is lower than a standard required by a first authentication mode.

The first authentication mode is an identity authentication mode used to switch the first device from the locked state to the unlocked state.

In some embodiments, the first authentication mode is an identity authentication mode whose authentication capability level (ACL) is higher than a third value, or the first authentication mode is preset by the first device. For example, the first authentication mode may include password authentication, graphic authentication, fingerprint authentication, and face authentication.

The identity authentication information that is lower than the standard required by the first authentication mode may include a biometric feature whose matching degree with a prestored first biometric feature is less than a first value, and the first biometric feature is identity authentication information corresponding to the first authentication mode. The first value may be preset.

2. Identity authentication information that meets a standard required by a second authentication mode.

The second authentication mode is an identity authentication mode other than the first authentication mode.

In some embodiments, in some embodiments, the second authentication mode is an identity authentication mode other than the first authentication mode. The second authentication mode may be an identity authentication mode whose authentication capability level (ACL) is relatively low, or the second authentication mode is preset by the first device. For example, the second authentication mode may include voiceprint authentication, heart rate authentication, and body posture authentication.

The identity authentication information that meets the standard required by the second authentication mode includes a biometric feature whose matching degree with a prestored second biometric feature reaches a second value, and the second biometric feature is identity authentication information corresponding to the second authentication mode. The second value may be preset.

With reference to the first aspect, in some implementations, the first device may obtain the first authentication factor by using any one or more of the following:

- the first device captures a voice or an image, and identifies the first authentication factor carried in the voice or the image;
- the first device receives a voice or an image sent by the second device, and identifies the first authentication factor carried in the voice or the image; or
- the first device receives the first authentication factor sent by the second device.

With reference to the first aspect, in some implementations, the first device may simultaneously obtain the first operation instruction and the first authentication factor. For example, the first device may capture a voice, identify semantics in the voice, and determine the semantics as the first operation instruction; and identify a voiceprint carried in the voice, and determine the voiceprint as the first authentication factor. Alternatively, the first device may capture an image, identify a gesture, a facial expression, or a body posture in the image, and determine the gesture, the facial expression, or the body posture in the image as the first operation instruction; and identify a biometric feature carried in the image, and determine the biometric feature as the first authentication factor.

With reference to the first aspect, in some implementations, after the first device accesses the first resource in response to the first operation instruction, the first device may further receive a user operation, where the user operation is used to request to access a second resource of the first device. If the resources that the first device is allowed to access include the second resource, the first device accesses the second resource in response to the user operation; or if the resources that the first device is allowed to access does not include the second resource, the first device refuses to respond to the user operation.

In the foregoing implementation, an operation that can be performed by the first device may be limited to a specific range, thereby avoiding expansion of permission and protecting data security of the first device.

With reference to the first aspect, in some implementations, after accessing the first resource in response to the first operation instruction, the first device may further obtain a second authentication factor, where the second authentication factor includes identity authentication information that meets the unlocking requirement of the first device or includes a predefined quantity of first authentication factors; and the first device switches from the locked state to the unlocked state based on the second authentication factor. When the second authentication factor is the predefined quantity of first authentication factors, the user may complete identity authentication by inputting first authentication factors for a plurality of times, to trigger unlocking of the electronic device.

With reference to the foregoing implementation, after determining the resources that the first device is allowed to access and before obtaining the second authentication factor, the first device may display a first control, detect an operation performed on the first control, and start to detect identity authentication information in response to the operation performed on the first control. In other words, the user may actively trigger the first device to start to detect the identity authentication information, to obtain the second authentication factor and perform unlocking. In this way, the user may determine, based on a requirement of the user, whether to perform unlocking, thereby reducing power consumption of the first device.

With reference to the first aspect, in some implementations, after determining the resources that the first device is allowed to access, the first device may create a limited execution environment. In the limited execution environment, the first device is allowed to access the resources that are determined as allowed for access. The first device may access the first resource in the limited execution environment in response to the first operation instruction.

In the foregoing implementation, when specifically creating the limited execution environment, the first device may record operations that are determined as allowed to be performed. In other words, the first device records specific access operations that are allowed to be performed on which resources or which type of resources by the first device.

According to a second aspect, an embodiment of this application provides a cross-device access control method, including: A first device in a locked state receives a second operation instruction sent by a third device, where the second operation instruction is used to request to access a third resource of the first device; the first device determines, based on the second operation instruction, resources that the first device is allowed to access; and if the resources that the first device is allowed to access include the third resource, the first device accesses the third resource in response to the second operation instruction.

According to the method in the second aspect, an electronic device no longer determines, only based on whether the electronic device is unlocked, whether to respond to and perform a corresponding operation, but implements finer-grained access control for various types of resources based on an operation instruction, thereby enriching use scenarios and use scopes of the electronic device. For a user, the electronic device may be triggered to perform some operations without performing complex authentication to unlock the electronic device, so that the user can control the electronic device more easily and conveniently.

With reference to the second aspect, in some implementations, the first device may determine, based on a risk level of accessing the third resource, the resources that the first device is allowed to access, where if the risk level of accessing the third resource is higher, the first device is allowed to access fewer resources. If privacy of the third resource is higher, the risk level of accessing the third resource is higher. In this way, a resource access risk can be fully considered to avoid data leakage and the like.

With reference to the second aspect, in some implementations, the third resource includes a resource that is predefined as inaccessible to the first device in the locked state. Herein, the third resource is the same as the first resource in the first aspect. For details, refer to the related descriptions of the first aspect.

With reference to the second aspect, in some implementations, the third operation instruction includes any one of the following: semantics carried in a voice, a gesture, a facial expression, and a body posture.

With reference to the second aspect, in some implementations, the third operation instruction is a projection request. In this way, for data sharing scenarios such as projection and multi-screen interaction, when one device shares data with another device, the another device does not need to be unlocked. In comparison with a solution in which the another device needs to be unlocked first each time data is shared, in this embodiment of this application, difficulty and complexity of projection and multi-screen interaction are reduced, and better user experience can be brought to the user.

With reference to the second aspect, in some implementations, after accessing the third resource in response to the second operation instruction, the first device may receive a user operation, where the user operation is used to request to access a fourth resource of the first device. If the resources that the first device is allowed to access include the fourth resource, the first device accesses the fourth resource in response to the user operation; or if the resources that the first device is allowed to access does not include the fourth resource, the first device refuses to respond to the user operation.

In the foregoing implementation, an operation that can be performed by the first device may be limited to a specific range, thereby avoiding expansion of permission and protecting data security of the first device.

With reference to the second aspect, in some implementations, after accessing the third resource in response to the second operation instruction, the first device may obtain a second authentication factor, where the second authentication factor includes identity authentication information that meets an unlocking requirement of the first device or includes a predefined quantity of first authentication factors; and the first device switches from the locked state to an unlocked state based on the second authentication factor. When the second authentication factor is the predefined quantity of first authentication factors, the user may complete identity authentication by inputting first authentication factors for a plurality of times, to trigger unlocking of the electronic device.

With reference to the foregoing implementation, after determining the resources that the first device is allowed to access and before obtaining the second authentication factor, the first device may display a first control, detect an operation performed on the first control, and start to detect identity authentication information in response to the operation performed on the first control. In other words, the user may actively trigger the first device to start to detect the identity authentication information, to obtain the second authentication factor and perform unlocking. In this way, the user may determine, based on a requirement of the user, whether to perform unlocking, thereby reducing power consumption of the first device.

With reference to the second aspect, in some implementations, after determining the resources that the first device is allowed to access, the first device may create a limited execution environment. In the limited execution environment, the first device is allowed to access the resources that are determined as allowed for access. The first device may access the third resource in the limited execution environment in response to the second operation instruction.

In the foregoing implementation, when specifically creating the limited execution environment, the first device may record operations that are determined as allowed to be performed. In other words, the first device records specific access operations that are allowed to be performed on which resources or which type of resources by the first device.

According to a third aspect, an embodiment of this application provides an electronic device, including a memory and one or more processors, where the memory is coupled to the one or more processors, the memory is configured to store computer program code, the computer program code includes computer instructions, and the one or more processors invoke the computer instructions to enable the electronic device to perform the method in the first aspect or any one of the implementations of the first aspect.

According to a fourth aspect, an embodiment of this application provides an electronic device, including a memory and one or more processors, where the memory is coupled to the one or more processors, the memory is configured to store computer program code, the computer program code includes computer instructions, and the one or more processors invoke the computer instructions to enable the electronic device to perform the method in the second aspect or any one of the implementations of the second aspect.

According to a fifth aspect, an embodiment of this application provides a communication system, including a first device and a second device. The first device is configured to perform the method in the first aspect or any one of the implementations of the first aspect.

According to a sixth aspect, an embodiment of this application provides a communication system, including a first device and a third device. The first device is configured to perform the method in the second aspect or any one of the implementations of the second aspect.

According to a seventh aspect, an embodiment of this application provides a computer-readable storage medium, including instructions. When the instructions are run on an electronic device, the electronic device is enabled to perform the method in the first aspect or any one of the implementations of the first aspect.

According to an eighth aspect, an embodiment of this application provides a computer program product. When the computer program product is run on a computer, the computer is enabled to perform the method in the second aspect or any one of the implementations of the second aspect.

According to a ninth aspect, an embodiment of this application provides a computer-readable storage medium, including instructions. When the instructions are run on an electronic device, the electronic device is enabled to perform the method in the first aspect or any one of the implementations of the first aspect.

According to a tenth aspect, an embodiment of this application provides a computer program product. When the computer program product is run on a computer, the computer is enabled to perform the method in the second aspect or any one of the implementations of the second aspect.

According to the technical solutions provided in this application, after an electronic device in a locked state obtains an operation instruction and identity authentication information that does not meet an unlocking requirement, the electronic device may determine whether to allow access to a resource that the operation instruction requests to access, and if yes, access the corresponding resource in response to the operation instruction. According to the method, a user can trigger the electronic device to access the corresponding resource in the locked state without performing complex authentication to unlock the electronic device, so that the user can control the electronic device more easily and conveniently. In addition, the electronic device no longer determines, based on whether the electronic device is unlocked, whether to perform some operations. In this way, finer-grained access control can be implemented, thereby enriching use scenarios and use scopes of the electronic device.

BRIEF DESCRIPTION OF THE DRAWINGS

FIG. 8A and FIG. 8B are schematic diagrams of a software structure of an electronic device 100 according to an embodiment of this application.

DETAILED DESCRIPTION OF ILLUSTRATIVE EMBODIMENTS

Figure 1:
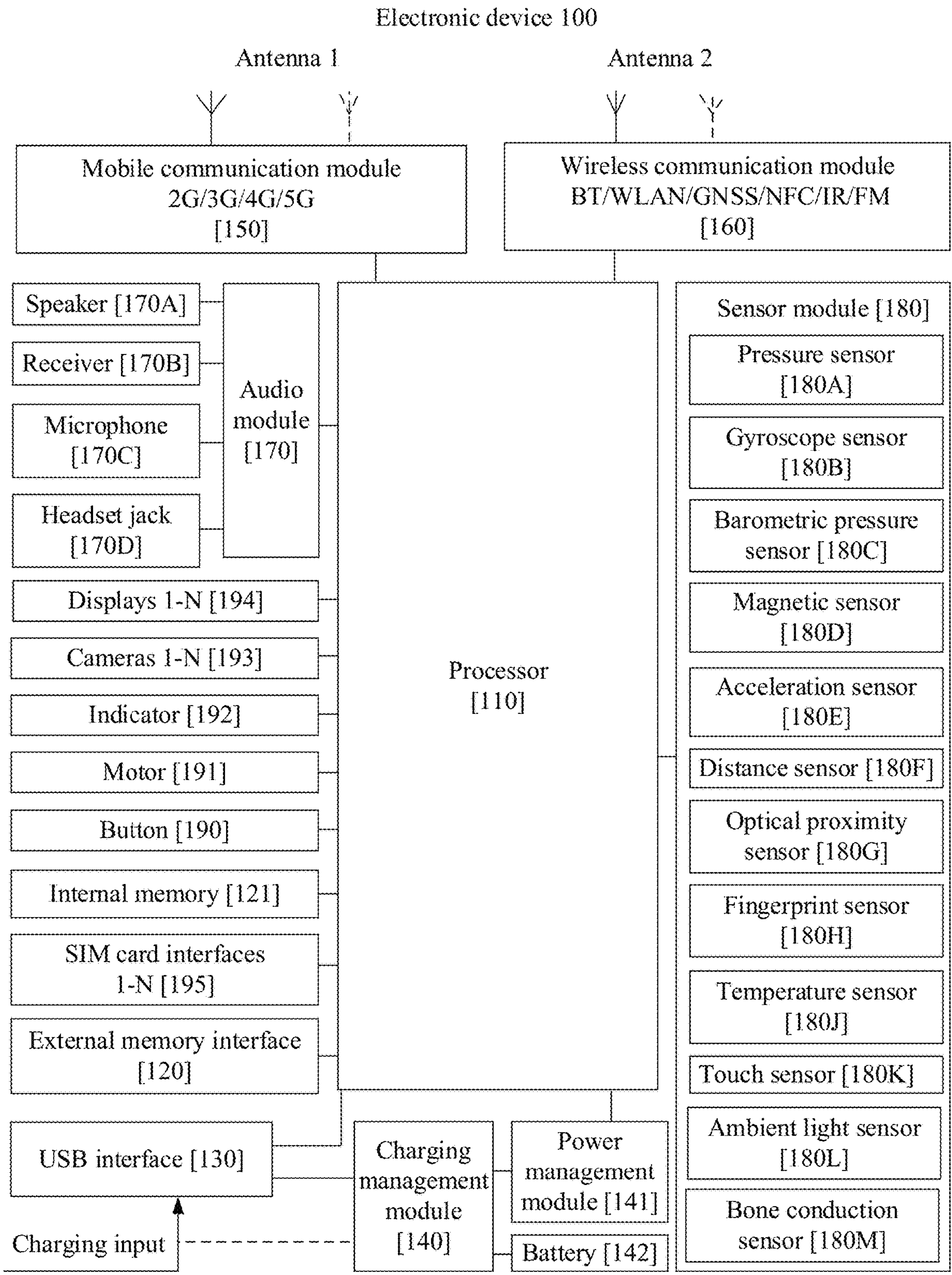
FIG. 1 is a schematic diagram of a hardware structure of an electronic device according to an embodiment of this application.

The technical solutions according to embodiments of this application are clearly and completely described in the following with reference to the accompanying drawings. In the descriptions of embodiments of this application, unless otherwise specified, "/" indicates "or". For example, A/B may indicate A or B. The term "and/or" in this specification merely describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

A term "user interface (UI)" in the following embodiments of this application is a medium interface for interaction and information exchange between an application or an operating system and a user, and implements information form conversion between an internal form and a form acceptable by the user. The user interface is source code written in a specific computer language like Java or an extensible markup language (XML). Interface source code is parsed and rendered on an electronic device, and is finally presented as content that can be identified by the user. The user interface is generally represented in a form of a graphical user interface (GUI), and is a user interface that is related to a computer operation and that is displayed in a graphic manner. The user interface may be a visual interface element like a text, an icon, a button, a menu, a tab, a text box, a dialog box, a status bar, a navigation bar, or a widget that is displayed on a display of the electronic device.

In embodiments of this application, the electronic device has two states: a locked state and an unlocked state.

In the locked state, the electronic device can perform only a predefined operation, and cannot perform an operation other than the predefined operation. The locked state may be used to avoid a misoperation of a user, or prevent the electronic device from performing an operation other than the predefined operation.

In embodiments of this application, that the electronic device performs an operation specifically means that the electronic device performs an access operation on a resource. The access operation may include, for example, reading, adding, deleting, writing, modifying, or execution.

In embodiments of this application, resources in the electronic device may include one or more of the following: a software resource, a hardware resource, a peripheral, a peripheral resource, and the like of the electronic device.

The hardware resource is related to hardware configured for the electronic device, for example, may include a camera, a sensor, an audio device, a display, a motor, and a flash of the electronic device.

The software resource is related to software configured for the electronic device, for example, may include an application (APP) or a service component installed in the electronic device, a memory resource, a computing capability (for example, a beautification algorithm capability or an audio/video encoding/decoding capability), a network capability, a device connection capability, a device discovery capability, and a data transmission capability. The software resource may include a system resource, or may include a third-party resource. This is not limited herein.

The peripheral is a device that is connected to the electronic device and that is configured to transmit, forward, and store data and information. The peripheral may include, for example, an accessory device of the electronic device like a mouse, an external display, a Bluetooth headset, or a keyboard, and a smartwatch or a smart band managed by the electronic device. The peripheral resource may include a hardware resource and a software resource. For the hardware resource and the software resource, refer to the foregoing related descriptions.

In embodiments of this application, the predefined operation may be predefined by a producer of the electronic device, and cannot be modified. The producer of the electronic device may include a manufacturer, a supplier, a provider, and the like of the electronic device. The manufacturer may be a vendor that manufactures the electronic device by making or purchasing parts and raw materials. The supplier may be a vendor that provides a structural design, raw materials, or parts of the electronic device. For example, a manufacturer of Huawei Mate series mobile phones is Huawei Technologies Co., Ltd.

The predefined operation does not involve user privacy data, and includes only some basic operations or common operations. The predefined operation may include, for example, starting or closing some basic applications, for example, starting a camera application, turning on a flashlight, starting a calculator, scanning a two-dimensional code, disabling/enabling Bluetooth, disabling/enabling a cellular signal, and enabling/disabling a Wireless Fidelity (Wi-Fi) signal. In addition, after starting the camera application, the electronic device cannot enter a gallery or an album by using the camera application.

Operations other than the predefined operation may include operations related to the user privacy data and some operations not related to the user privacy data. The user privacy data may include user data stored in each application, for example, a photo, a video, audio, contact information, a browsing history, and a shopping history of the user. The operations related to the user privacy data may include, for example, opening or closing a gallery, an album, an address book, a shopping application, an instant messaging application, a memo, and sharing user data through a background, Wi-Fi, a USB, Bluetooth, or the like. Some operations not related to user privacy may include, for example, starting a navigation application but not reading user data, starting a browser but not reading a browsing history, and starting a video application but not reading a browsing history. The navigation application may also be referred to as another term like a map application.

In the unlocked state, in addition to the predefined operation in the locked state, the electronic device may perform operations other than the predefined operation. For example, the electronic device in the unlocked state may perform operations related to the user privacy data, for example, opening a gallery or an album, starting a shopping application and viewing a shopping history, starting an instant messaging application, viewing a memo, viewing navigation data, and viewing a browsing history of a browser.

In embodiments of this application, the locked state may also be referred to as another noun like a lock screen state. Similarly, the unlocked state may also be referred to as another noun. This is not limited herein. For ease of description, the locked state and the unlocked state are used for description below.

The electronic device may preset a plurality of identity authentication modes, and receive identity authentication information corresponding to a preset identity authentication mode in the locked state, and is unlocked and enter the unlocked state after determining that the input identity authentication information meets an identity authentication standard.

Identity authentication is a technology used to verify a user identity. Currently, identity authentication modes may include password authentication, graphic authentication, and biometric feature authentication. Different users may be distinguished by using different identity authentication information. Specifically, the electronic device may prestore a password, a graph, or a biometric feature. When a user inputs the prestored password or graph, or a biometric feature whose matching degree with the prestored biometric feature reaches a specific value, the electronic device may determine that the user is a user whose information is previously prestored. A value of the matching degree may be preset. If the value of the matching degree is larger, accuracy of the biometric feature authentication mode is higher.

The password may be a character string consisting of digits, letters, and symbols.

Biometric features are classified into two types: a body feature and a behavior feature. The body feature includes face, voiceprint, fingerprint, palm type, retina, iris, body odor, face type, blood pressure, blood oxygen, blood glucose, respiratory rate, heart rate, electrocardiogram in one cycle, and deoxyribonucleic acid (DNA). The behavior feature includes signature, body posture (for example, walking gait), and the like.

Because accuracy of extracting various types of information, such as passwords, graphs, and various biometric features, by the electronic device is different, each of the foregoing identity authentication modes has a corresponding authentication capability level (ACL). If the ACL is higher, an identity authentication result obtained in this authentication mode is more reliable. Accuracy of extracting information by the electronic device depends on a current technical development situation. For example, accuracy of extracting a password and a fingerprint by the electronic device is very high, but accuracy of extracting a voiceprint and a signature is relatively low. For a same type of information, when different electronic devices use different algorithms, accuracy of extracting information by different electronic devices in this identity authentication mode is also different.

Objectively speaking, an ACL of an identity authentication mode may be determined based on a false accept rate (FAR), a false reject rate (FRR), and a spoof accept rate (SAR) when the identity authentication mode is used. If the FAR, the FRR, and the SAR are lower, the ACL is higher. For example, ACLs of password authentication/graphic authentication, face authentication/fingerprint authentication, voiceprint authentication, and body posture authentication decrease sequentially.

ACLs may be classified into a plurality of levels of different granularities. This is not limited herein. For example, the ACLs may be classified into four levels.

To ensure data security, the electronic device is usually unlocked only by using an identity authentication mode with a relatively high ACL, and is not unlocked by using an identity authentication mode with a relatively low ACL.

For ease of description, subsequently, an identity authentication mode used by the electronic device for unlocking is referred to as a first authentication mode, and an identity authentication mode other than the identity authentication mode used by the electronic device for unlocking is referred to as a second authentication mode. The first authentication mode may be set by the electronic device or a producer of the electronic device. This is not limited herein. For example, password authentication, graphic authentication, fingerprint authentication, and face authentication may be set for the electronic device for unlocking, but voiceprint authentication, heart rate authentication, and body posture authentication are not used for unlocking.

In the locked state, the electronic device may receive identity authentication information input by the user, and after determining that the input identity authentication information meets a standard of the first authentication mode, the electronic device is unlocked and enters the unlocked state. To input the identity authentication information that meets the standard, the user needs to perform a complex operation. For example, the user needs to strictly input a preset password or graph, align a face with a front-facing camera of the electronic device within a specific distance and stay still, or press a location of a fingerprint recognition sensor by using a clean finger and stay still. In other words, the user can unlock the device only by performing a complex authentication operation or even a plurality of authentication operations, which wastes a large amount of time and power consumption of the electronic device.

In addition, more and more users control electronic devices by using a voice instruction, a body posture, or the like, and can control the electronic devices without touching in scenarios such as driving, cooking, and exercise, thereby greatly facilitating the users. However, because an ACL of an authentication mode like voiceprint authentication or body posture authentication is relatively low, the electronic device cannot be directly unlocked by using a voice, a body posture, or a remote gesture, and needs to be unlocked by using another identity authentication mode with a relatively high ACL. This results in a loss of convenience of a voice instruction, a body posture, and a remote gesture, creating an obstacle for the user to easily and conveniently control the electronic device.

It can be learned that, if the user wants to trigger the electronic device to perform an operation other than the predefined operation in the locked state, identity authentication information that meets a standard of an identity authentication mode with a relatively high ACL needs to be input in a complex manner, to unlock the device. This reduces convenience of the electronic device, and brings an obstacle for the user to use the electronic device.

The following embodiments of this application provide a weak authentication factor-based access control method. In this method, after an electronic device in a locked state obtains a first operation instruction and a weak authentication factor, the electronic device may create a limited execution environment based on a risk level of an operation corresponding to the first operation instruction and a security level of the weak authentication factor, and perform the corresponding operation in the limited execution environment in response to the first operation instruction.

A correspondence between the first operation instruction and the operation corresponding to the first operation instruction is preset by the electronic device. The first operation instruction may be directly received by the electronic device, or may be obtained by another device and then sent to the electronic device. For specific content of the first operation instruction, refer to detailed descriptions of the subsequent method embodiments. Details are not described herein.

In some embodiments, the first operation instruction is used to request the electronic device to perform an operation other than the predefined operation in the locked state. For details about the locked state, the predefined operation, and the operation other than the predefined operation, refer to the foregoing related descriptions.

The weak authentication factor is identity authentication information that does not meet an unlocking requirement of the electronic device. The weak authentication factor may include the following two types: 1. Identity authentication information that is lower than a standard required by a first authentication mode. 2. Identity authentication information that meets a standard required by a second authentication mode. The weak authentication factor may be directly captured by the electronic device, or may be captured by another device and then sent to the electronic device. For specific content of the weak authentication factor, refer to detailed descriptions of the subsequent method embodiments. Details are not described herein.

In some embodiments, the electronic device may separately receive the first operation instruction and the weak authentication factor.

In some embodiments, the electronic device may simultaneously receive the first operation instruction and the weak authentication factor.

The limited execution environment is an execution environment that is restricted. The execution environment may include a hardware environment and a software environment. The execution environment may be a sandbox, or may be a function field including a plurality of functions. In the limited execution environment, the electronic device can perform only a part of specified operations, and cannot perform an operation other than the part of specified operations. In other words, in the limited execution environment, the electronic device can access only a part of resources of the electronic device, and cannot access a resource other than the part of resources. The limited execution environment in embodiments of this application may also be referred to as a restricted execution environment, a limited running environment, a limited field, or the like. This is not limited herein.

The electronic device may create the limited execution environment based on the risk level of the operation corresponding to the first operation instruction and the security level of the weak authentication factor. If the risk level of the operation corresponding to the first operation instruction is lower or the security level of the weak authentication factor is higher, more resources are accessible in the limited execution environment created by the electronic device. For details about the risk level of the operation, the security level of the weak authentication factor, a manner of creating the limited execution environment, and the like, refer to related descriptions of the subsequent method embodiments.

According to the foregoing weak authentication factor-based access control method, the electronic device no longer determines, based on only whether the electronic device is unlocked, whether to respond to and perform a corresponding operation, but determines, based on a risk level of an operation instruction and a security level of a weak authentication factor, whether to perform the operation. In this way, finer-grained access control can be implemented, thereby enriching use scenarios and use scopes of the electronic device. For the user, the electronic device may be triggered to perform an operation other than the predefined operation in the locked state without performing complex authentication to unlock the electronic device, so that the user can control the electronic device more easily and conveniently. In addition, the electronic device no longer simply classifies resources into a resource accessible through a predefined operation and a resource accessible through another operation, and further implements fine-grained access control for various types of resources.

Embodiments of this application further provide a cross-device access control method. The method is applied to a communication system including two electronic devices. In this method, one electronic device may send a second operation instruction to another electronic device, and the another electronic device may create a limited execution environment based on a risk level of an operation corresponding to the second operation instruction, and perform the corresponding operation in the limited execution environment in response to the second operation instruction.

A correspondence between the second operation instruction and the operation corresponding to the second operation instruction is preset by the electronic device. The second operation instruction is an operation instruction sent by the another electronic device, for example, may be a projection request. For specific content of the second operation instruction, refer to detailed descriptions of the subsequent method embodiments. Details are not described herein.

In some embodiments, the second operation instruction is used to request the electronic device to perform an operation other than the predefined operation in the locked state.

If the risk level of the operation corresponding to the second operation instruction is lower, more resources are accessible in the limited execution environment created by the electronic device.

According to the foregoing cross-device access control method, the electronic device no longer determines, based on only whether the electronic device is unlocked, whether to respond to a user operation, but determines, based on a risk level of an operation instruction received by a cross-device, whether to respond to the user operation. In this way, finer-grained access control can be implemented, thereby enriching use scenarios and use scopes of the electronic device. For the user, the electronic device may be triggered to perform an operation other than the predefined operation in the locked state without performing complex authentication to unlock the electronic device, so that the user can control the electronic device more easily and conveniently. In addition, the electronic device no longer simply classifies resources into a resource accessible through a predefined operation and a resource accessible through another operation, and further implements fine-grained access control for various types of resources.

In the foregoing two access control methods, after the electronic device creates the limited execution environment, if the electronic device receives a user operation, and the user operation requests to perform an operation other than the operation allowed to be performed in the limited execution environment, the electronic device may prompt the user to perform unlocking. After being unlocked based on triggering of the user, the electronic device may respond to the previously received user operation, and perform the corresponding operation.

In the foregoing two access control methods, after the electronic device creates the limited execution environment, the user may alternatively actively trigger unlocking of the electronic device. After being unlocked, the electronic device may perform various operations in response to the user operation.

The following first describes an electronic device 100 provided in embodiments of this application.

The electronic device 100 may be of various types. A specific type of the electronic device 100 is not limited in embodiments of this application. For example, the electronic device 100 includes a mobile phone, and may further include a tablet computer, a desktop computer, a laptop computer, a handheld computer, a notebook computer, a large-screen television, a smart screen, a wearable device, an augmented reality (AR) device, a virtual reality (VR) device, an artificial intelligence (AI) device, an on-board unit, a smart headset, a game console, and an Internet of Things (IOT) device or a smart home device like a smart water heater, a smart lamp, a smart air conditioner, or a camera. This is not limited thereto. The electronic device 100 may further include a non-portable terminal device like a laptop computer (laptop) having a touch-sensitive surface or a touch panel, a desktop computer having a touch-sensitive surface or a touch panel, and the like.

FIG. 1 is a schematic diagram of a structure of the electronic device 100.

The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, some components may be combined, or some components may be split, or different component arrangements may be used. The illustrated components may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

The processor 110 may further be provided with a memory for storing instructions and data. In some embodiments, the memory in the processor 110 is a cache memory. The memory may store instructions or data that have just been used or used repeatedly by the processor 110. If the processor 110 needs to use the instructions or data again, the processor 110 may directly invoke the instructions or data from the memory. This avoids repeated access and reduces a waiting time of the processor 110, thereby improving system efficiency.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 150 may provide a wireless communication solution that includes 2G/3G/4G/5G or the like and that is applied to the electronic device 100. The mobile communication module 150 may include at least one filter, switch, power amplifier, low noise amplifier (LNA), and the like. The mobile communication module 150 may receive an electromagnetic wave via the antenna 1, perform filtering, amplification, and other processing on the received electromagnetic wave, and then transmit the electromagnetic wave to the modem processor for demodulation. The mobile communication module 150 may further amplify a signal modulated by the modem processor, and convert the signal into an electromagnetic wave for radiation via the antenna 1. In some embodiments, at least some of the function modules of the mobile communication module 150 may be disposed in the processor no. In some embodiments, at least some of the function modules of the mobile communication module 150 and at least some of the modules of the processor 110 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then the demodulator transmits the low-frequency baseband signal obtained through demodulation to the baseband processor for processing. The low-frequency baseband signal is transmitted to the application processor after being processed by the baseband processor. The application processor outputs a sound signal through an audio device (not limited to the speaker 170A, the receiver 170B, and the like), or displays an image or a video through the display 194. In some embodiments, the modem processor may be an independent component. In some other embodiments, the modem processor may be independent of the processor 110, and may be disposed in a same component as the mobile communication module 150 or other function modules.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processing module. The wireless communication module 160 receives an electromagnetic wave via the antenna 2, performs demodulation and filtering on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation via the antenna 2.

In some embodiments, in the electronic device 100, the antenna 1 and the mobile communication module 150 are coupled, and the antenna 2 and the wireless communication module 160 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time-division code division multiple access (TD-SCDMA), long term evolution (LTE), BT, a GNSS, WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 100 implements a display function through the GPU, the display 194, the application processor, and the like. The GPU is a microprocessor for image processing and is connected to the display 194 and the application processor. The GPU is configured to perform mathematical and geometric computation for graphic rendering. The processor 110 may include one or more GPUs that execute program instructions to generate or change display information.

The display 194 is configured to display an image, a video, or the like. The display 194 includes a display panel. The display panel may use a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N displays 194, where N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format like an RGB format or a YUV format. In some embodiments, the electronic device 100 may include one or N cameras 193, where N is a positive integer greater than 1.

The digital signal processor is configured to process a digital signal, and may process a digital signal in addition to the digital image signal. For example, when the electronic device 100 selects a frequency, the digital signal processor is configured to perform Fourier transform on frequency energy.

The NPU is a neural network (NN) computing processor. With reference to a structure of a biological neural network, for example, with reference to a transmission mode between human brain neurons, the NPU quickly processes input information, and can continuously perform self-learning. Applications such as intelligent cognition of the electronic device 100 may be implemented by using the NPU, for example, image recognition, facial recognition, speech recognition, and text understanding.

The internal memory 121 may include one or more random access memories (RAM) and one or more non-volatile memories (NVM).

The random access memory may be directly read and written by the processor 110, and may be configured to store an operating system or an executable program (for example, machine instructions) of another running program, and may be further configured to store data of a user and an application, and the like.

The non-volatile memory may also store an executable program, data of a user and an application, and the like, which may be loaded to the random access memory in advance, so that the processor 110 directly performs reading and writing.

The external memory interface 120 may be configured to connect to an external non-volatile memory, to extend a storage capability of the electronic device 100.

The electronic device 100 may implement an audio function like music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode the audio signal. In some embodiments, the audio module 170 may be disposed in the processor 110, or some function modules of the audio module 170 may be disposed in the processor 110.

The speaker 170A, also referred to as a "horn", is configured to convert an audio electrical signal into a sound signal. The electronic device 100 may be used to listen to music or listen to a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to listen to a voice.

The microphone 170C, also referred to as a "mike" or a "microphone", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect wired earphones. The headset jack 170D may be the USB port 130, or may be a 3.5 mm open mobile terminal platform (OMTP) standard interface or cellular telecommunication industry association of the USA (CTIA) standard interface.

The pressure sensor 180A is configured to sense a pressure signal, and convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. In some embodiments, touch operations that are performed in a same touch location but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is performed.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation on or near the touch sensor. The touch sensor may transmit the detected touch operation to the application processor to determine a type of a touch event. A visual output related to the touch operation may be provided on the display 194. In some other embodiments, the touch sensor 180K may alternatively be disposed on a surface of the electronic device 100 at a position different from that of the display 194.

The button 190 includes a power button, a volume button, or the like. The button 190 may be a mechanical button, or may be a touch button. The electronic device 100 may receive a key input, and generate a key signal input related to a user setting and function control of the electronic device 100.

The motor 191 may generate a vibration alert.

The indicator 192 may be an indicator light, and may be configured to indicate a charging status and a battery level change, or may be configured to indicate a message, a missed call, a notification, and the like.

The internal memory 121 is configured to store a predefined operation that can be performed by the electronic device in a locked state. Specifically, the internal memory 121 may record a resource accessible to the electronic device in the locked state and a specific access operation (for example, modification or reading) that can be performed on the resource. In some embodiments of this application:

The internal memory 121 may be configured to store one or more pieces of standard identity authentication information of a user. These pieces of identity authentication information are used to identify the user, and may include identity authentication information corresponding to a first authentication mode, or may include identity authentication information corresponding to a second authentication mode. For example, these pieces of identity authentication information may include password, graph, face, voiceprint, fingerprint, palm type, retina, iris, body odor, face type, blood pressure, blood oxygen, blood glucose, respiratory rate, heart rate, electrocardiogram in one cycle, deoxyribonucleic acid (DNA), signature, and body posture (for example, walking gait). The receiver 170B, the microphone 170C, the display 194, the camera 193, the button 190, the sensor module 180 (for example, the pressure sensor 180A and the gyro sensor 180B), a headset externally connected to the headset jack 170D, and the like may be configured to receive a first operation instruction input by the user. For detailed content of the first operation instruction, refer to descriptions of the subsequent method embodiments.

The mobile communication module 150 and the wireless communication module 160 may be configured to receive a first operation instruction sent by another device, and may be further configured to receive a weak authentication factor sent by the another device.

The display 194, the camera 193, the fingerprint sensor 180H, the receiver 170B, the microphone 170C, an optical sensor, an electrode, and the like may be configured to collect a weak authentication factor input by the user. Specifically, the display 194 may be configured to collect a password, a graph, and a signature that are input by the user. The camera 193 is configured to collect a face, an iris, a retina, a face shape, a body posture, and the like that are input by the user. The fingerprint sensor 180H may be configured to collect a fingerprint input by the user. The receiver 170B and the microphone 170C may be configured to collect a voice input by the user. The optical sensor may be configured to use a photoplethysmography (PPG) technology to collect a PPG signal (for example, blood pressure, blood oxygen, blood glucose, a respiratory rate, a heart rate, and an electrocardiogram in one cycle) and the like. The electrode configured in the electronic device 100 may be configured to use an electrocardiogram (ECG) technology to collect an electrocardiogram in one cycle.

The processor 110 may analyze the weak authentication factor obtained by the foregoing modules, to determine a security level of the weak authentication factor. The processor is further configured to determine a risk level of an operation corresponding to the first operation instruction. Then, the processor 110 is further configured to: create a limited execution environment based on the risk level of the operation corresponding to the first operation instruction and the security level of the weak authentication factor, and in response to the first operation instruction in the limited execution environment, schedule the modules of the electronic device 100 to perform the corresponding operation.

In some embodiments of this application:

The mobile communication module 150 and the wireless communication module 160 in the electronic device 100 may be configured to receive a second operation instruction sent by another device.

The processor 110 may be configured to determine a risk level of an operation corresponding to the second operation instruction. Then, the processor 110 is further configured to: create a limited execution environment based on the risk level of the operation corresponding to the second operation instruction, and in response to the second operation instruction in the limited execution environment, schedule the modules of the electronic device 100 to perform the corresponding operation.

For functions of the modules of the electronic device 100, refer to detailed descriptions of the subsequent method embodiments. Details are not described herein.

A software system of the electronic device 100 may use a layered architecture, an event-driven architecture, a microkernel architecture, a micro service architecture, or a cloud architecture. In embodiments of this application, an Android system with a layered architecture is used as an example to describe the software structure of the electronic device 100.

Figure 2:
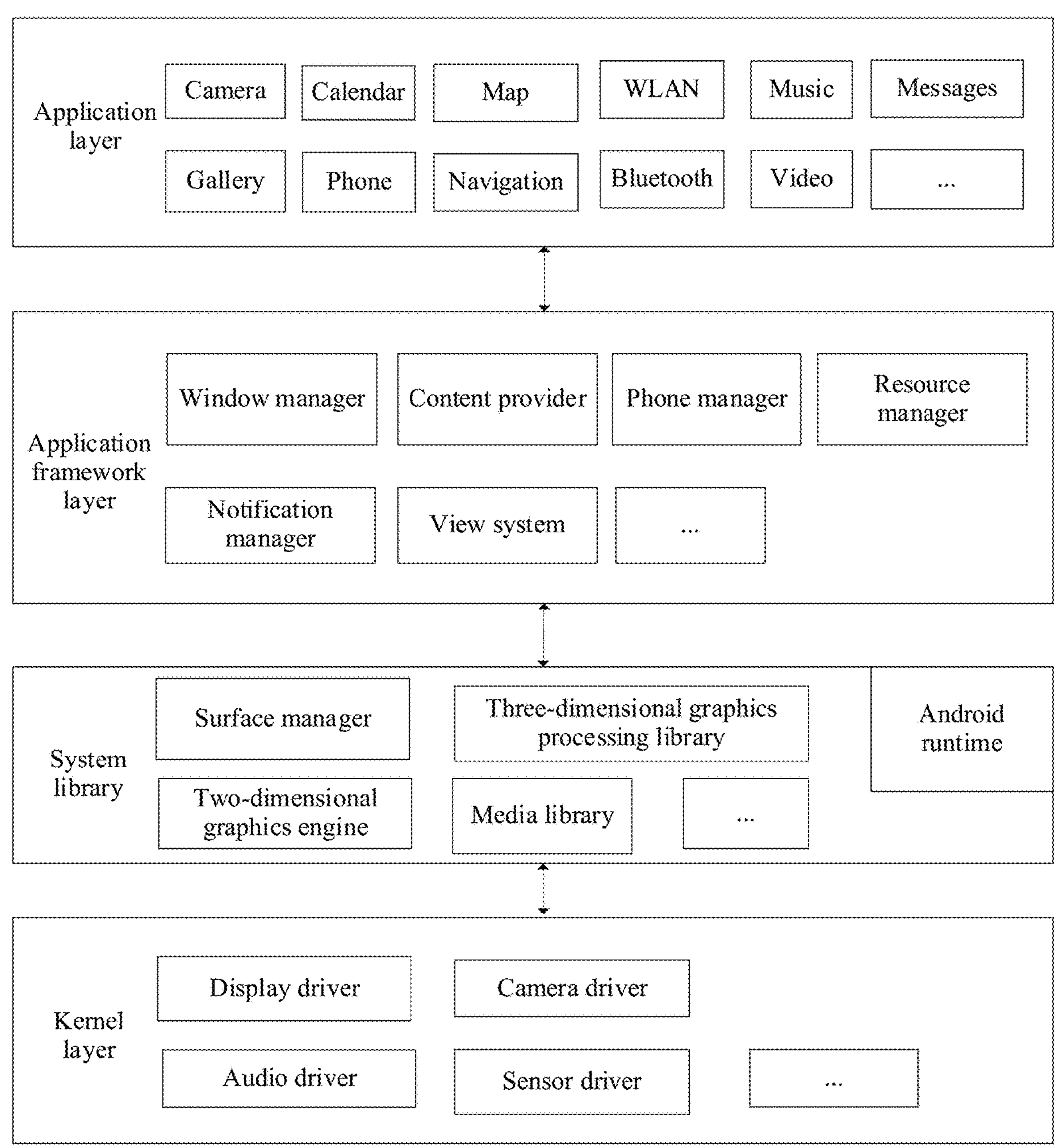
FIG. 2 is a schematic diagram of a software structure of an electronic device according to an embodiment of this application.

FIG. 2 is a block diagram of the software structure of the electronic device 100 in embodiments of this application.

In the layered architecture, software is divided into several layers, and each layer has a clear role and responsibility. The layers communicate with each other through a software interface. In some embodiments, the Android system is divided into four layers: an application layer, an application framework layer, Android runtime and a system library from top to bottom, and a kernel layer.

The application layer may include a series of application packages.

As shown in FIG. 2, the application packages may include applications such as Voice assistant, Camera, Gallery, Calendar, Phone, Map, Navigation, WLAN, Bluetooth, Music, Video, and Messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock the screen, capture the screen, and the like.

The content provider is configured to store and retrieve data and make the data accessible to an application. The data may include a video, an image, audio, calls made and received, a browsing history, a bookmark, a phonebook, and the like.

The view system includes a visual control like a control for displaying a text or a control for displaying a picture. The view system may be configured to build an application. A display interface may be composed of one or more views. For example, a display interface including a short message notification icon may include a view for displaying a text and a view for displaying a picture.

The phone manager is configured to provide a communication function for the electronic device 100, for example, management of a call status (including answering, declining, or the like).

The resource manager provides various resources for an application, such as a localized string, an icon, a picture, a layout file, and a video file.

The notification manager enables an application to display notification information in the status bar, and may be used to communicate a notification-type message, which may automatically disappear after a short stay without user interaction. For example, the notification manager is configured to notify download completing, a message prompt, and the like. The notification manager may alternatively be a notification that appears in a top status bar of the system in a form of a chart or a scroll bar text, for example, a notification of an application running in the background, or a notification that appears on the screen in a form of a dialog window. For example, text information is displayed in the status bar, an alert tone is issued, the electronic device vibrates, and an indicator light blinks.

The Android runtime includes a core library and a virtual machine. The Android runtime is responsible for scheduling and management of the Android system.

The core library includes two parts, namely, a functional function that needs to be invoked by the Java language, and a core library of Android.

The application layer and the application framework layer run in the virtual machine. The virtual machine executes a Java file of the application layer and the application framework layer as a binary file. The virtual machine is configured to perform functions such as object life cycle management, stack management, thread management, security and exception management, and garbage collection.

The system library may include a plurality of function modules, for example, a surface manager, a media library, a three-dimensional graphics processing library (for example, OpenGL ES), and a 2D graphics engine (for example, SGL).

The surface manager is configured to manage a display subsystem and provide merging of 2D and 3D layers for a plurality of applications.

The media library supports play and recording of various common audio and video formats, as well as still image files, and the like. The media library can support a variety of audio and video encoding formats, such as MPEG4, H.264, MP3, AAC, AMR, JPG, and PNG.

The three-dimensional graphics processing library is configured to implement three-dimensional graphics drawing, image rendering, synthesis, and layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a communication system 10 provided in embodiments of this application.

Figure 3:
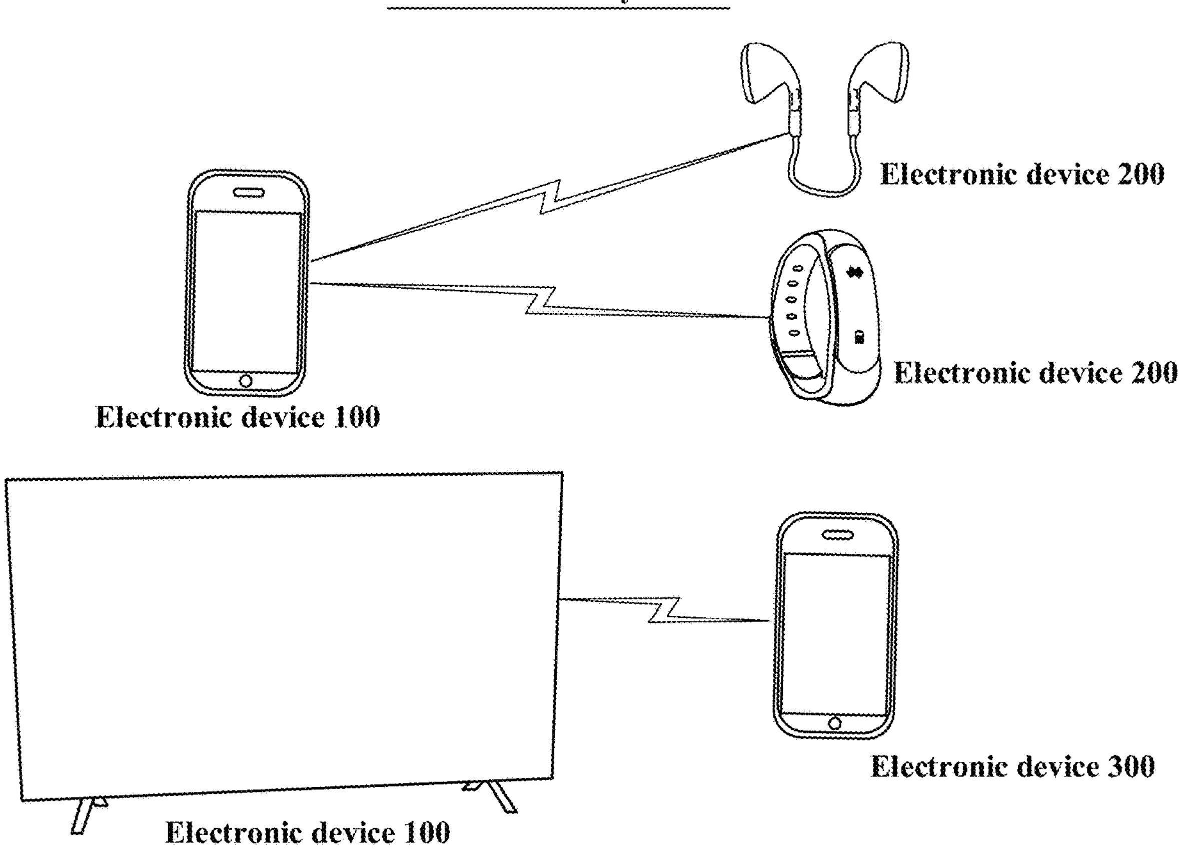
FIG. 3 is a structural diagram of a communication system according to an embodiment of this application.

As shown in FIG. 3, the communication system 10 includes an electronic device 100, and may further include an electronic device 200 or an electronic device 300.

There may be one or more electronic devices 100, electronic devices 200, or electronic devices 300.

For implementation of the electronic device 100 and operations performed by the electronic device 100, refer to the foregoing related descriptions in FIG. 1 or FIG. 2. Details are not described herein again.

A specific type of the electronic device 200 or the electronic device 300 is not limited in embodiments of this application. For a type of the electronic device 200 or the electronic device 300, refer to the foregoing descriptions of the type of the electronic device 100. For example, the electronic device 100 may be a smartphone, and the electronic device 200 may be a smartwatch, a smart band, or a headset. For another example, the electronic device 100 may be a smart screen, a large-screen television, or a notebook computer, and the electronic device 300 may be a smartphone.

A plurality of electronic devices in the communication system 10 may be configured with different software operating systems (OS), or may be configured with a same software operating system. Operating systems include but are not limited to Harmony®, Android®, iOS®, Windows®, Linux®, Unix®, Mac OS®, and the like. Harmony® is Huawei's HarmonyOS.

A communication connection is established between the electronic device 100 and the electronic device 200 or between the electronic device 100 and the electronic device 300. The communication connection may include but is not limited to a wired connection, a wireless connection like a Bluetooth (BT) connection, a wireless local area network (WLAN) such as a wireless fidelity point-to-point (Wi-Fi P2P) connection, a near field communication (NFC) connection, an infrared (IR) connection, a remote connection (for example, a connection established through a server), and the like.

For example, any two electronic devices in the communication system 10 may be connected by logging in to a same account. For example, two electronic devices may log in to a same Huawei account and remotely connect to and communicate with each other through a server. Any two electronic devices may alternatively log in to different accounts, but are connected in a binding manner. After one electronic device logs in to an account, the electronic device may be bound to another electronic device that logs in to a different account or that is not logged in to in a device management application, and then these electronic devices may communicate with each other through the device management application. Any two electronic devices may alternatively establish a connection by scanning a two-dimensional code, through near field communication (NFC) air touch, or by searching for a Bluetooth device, or the like. This is not limited herein. In addition, the electronic devices in the communication system 10 may alternatively be connected and communicate with each other in any one of the foregoing manners. This is not limited in embodiments of this application.

In some embodiments of this application, the electronic device 200 may be configured to receive a user operation that carries a first operation instruction, and then send indication information of the user operation to the electronic device 100. For example, when the electronic device 200 is a headset connected to the electronic device 100, the electronic device 200 may receive a voice instruction input by a user, and then send the voice instruction to the electronic device 100.

In some other embodiments of this application, the electronic device 200 may be configured to: receive a user operation that carries a first operation instruction, then identify the first operation instruction carried in the user operation, and send the first operation instruction to the electronic device 100. For example, when the electronic device 200 is a smartwatch connected to the electronic device 100, the electronic device 200 may receive a voice instruction "Play music with the mobile phone" input by the user, and then identify an intention of the voice instruction as triggering the mobile phone to play music. Then, the electronic device 200 may send, to the electronic device 100, the first operation instruction used to request the electronic device 100 to play music.

In some embodiments of this application, the electronic device 200 may be configured to: receive a user operation that carries a weak authentication factor, and then send indication information of the user operation to the electronic device 100. For example, when the electronic device 200 is a headset connected to the electronic device 100, the electronic device 200 may receive a voice instruction that carries a voiceprint and that is input by the user, and then send, to the electronic device 100, the voice instruction that carries the voiceprint.

In some other embodiments of this application, the electronic device 200 may be configured to: receive a user operation that carries a weak authentication factor, then identify the weak authentication factor carried in the user operation, and send the weak authentication factor to the electronic device 100. For example, when the electronic device 200 is a smartwatch connected to the electronic device 100, the electronic device 200 may receive a voice instruction that carries a voiceprint and that is input by the user, and then identify the voiceprint carried in the voice instruction. Then, the electronic device 200 may send the voiceprint information to the electronic device 100.

In embodiments of this application, the electronic device 300 may be configured to: receive a user operation, then identify an intention of the user operation, generate a second operation instruction based on the intention of the user operation, and then send the second operation instruction to the electronic device 100. For example, when the electronic device 300 is a smartphone and the electronic device 100 is a smart screen, the electronic device 300 may receive a user operation for projection to the smart screen, and then the electronic device 300 may generate a projection request (that is, a second operation instruction), and send the projection request to the smart screen.

The communication system 10 shown in FIG. 3 is merely an example. During specific implementation, the communication system 10 may further include more terminal devices. This is not limited herein. The communication system 10 may also be referred to as another term like a distributed system. This is not limited herein.

For functions of the devices in the communication system 10, refer to detailed descriptions of the subsequent method embodiments.

Figure 4:
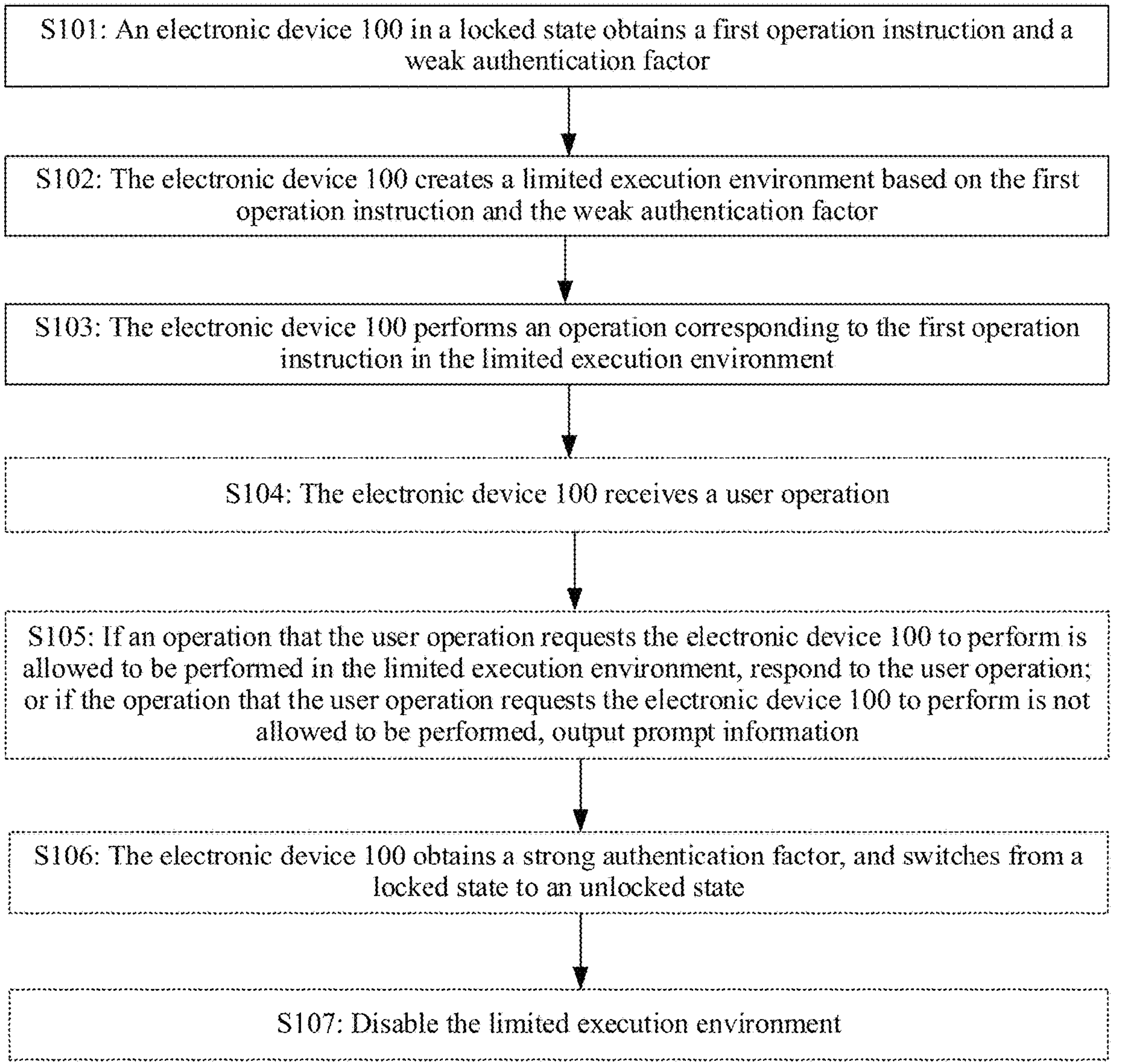
FIG. 4 is a flowchart of a weak authentication factor-based access control method according to an embodiment of this application.

FIG. 4 is a schematic flowchart of a weak authentication factor-based access control method according to an embodiment of this application.

As shown in FIG. 4, the method may include the following steps.

Step S101: An electronic device 100 in a locked state obtains a first operation instruction and a weak authentication factor.

In this embodiment of this application, the electronic device 100 may have two states: a locked state and an unlocked state. For specific definitions of the locked state and the unlocked state, refer to the foregoing related descriptions.

Figure 5A:
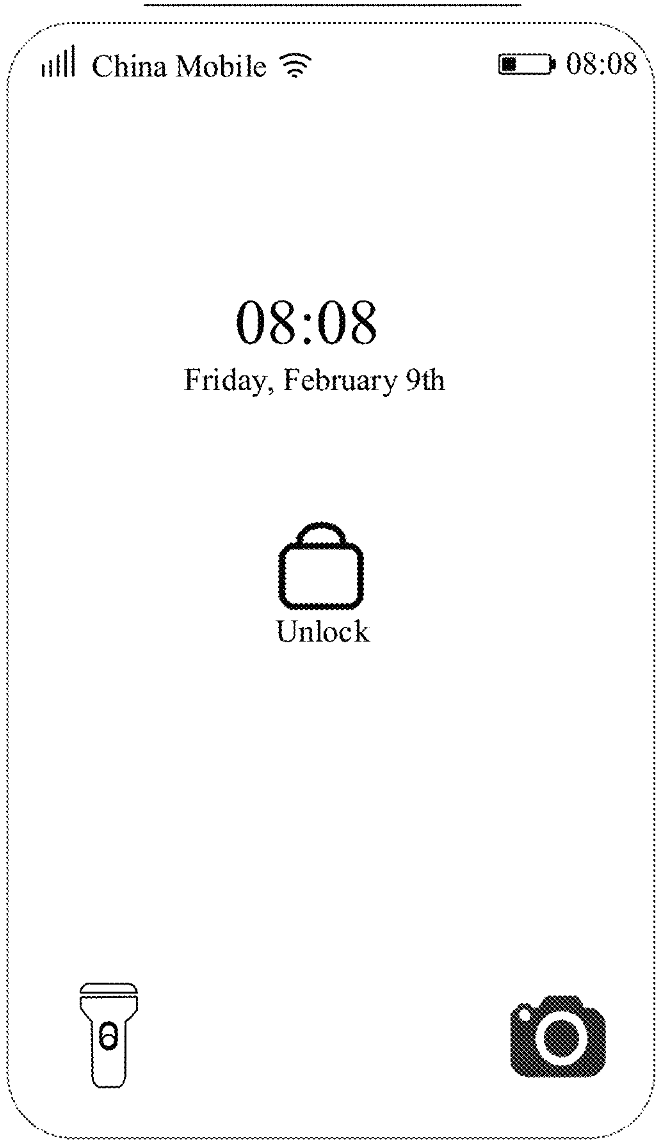
FIG. 5A shows a user interface displayed when an electronic device 100 is in a locked state according to an embodiment of this application.

When the electronic device 100 is in the locked state, a display may be in a screen-on state or a screen-off state. This is not limited herein. The electronic device 100 may enter the locked state by default when no user operation is received for a long time, or may enter the locked state in response to a user operation (for example, an operation of pressing a power button). For example, FIG. 5A shows a user interface 50 displayed when the electronic device 100 is in the locked state.

A correspondence between the first operation instruction and an operation that the first operation instruction requests the electronic device 100 to perform may be preset by the electronic device 100. This is not limited herein. In this embodiment of this application, a resource that the first operation instruction requests to access in the electronic device 100 may be referred to as a first resource. For classification and specific content of resources in the electronic device 100, refer to the foregoing related descriptions. The first resource may include one or more resources. This is not limited herein.

In some embodiments, the first operation instruction is used to request the electronic device 100 to perform an operation other than a predefined operation in the locked state. In other words, the first operation instruction is used to request to access a resource in the electronic device 100, and the electronic device cannot access this resource in the locked state. Specifically, the electronic device 100 prestores the predefined operation that can be performed in the locked state. To be specific, the electronic device 100 records a resource accessible in the locked state and a specific access operation (for example, reading, adding, deleting, writing, or modifying) that can be performed on the resource. For details about the predefined operation, refer to the foregoing related descriptions.

A form of the first operation instruction is not limited in embodiments of this application. The first operation instruction may include but is not limited to, for example, semantics carried in a voice, a gesture, a facial expression, a signature, a body posture, a lip shape, a button pressing operation, or a shake operation. The gesture, the facial expression, the signature, the body posture, and the lip shape may be static information at a time point, for example, a gesture at a time point, or may be dynamic change information within a period of time, for example, a lip shape change within a period of time.

The electronic device 100 may obtain the first operation instruction in the following several manners:

1. The electronic device 100 directly receives a user operation that carries the first operation instruction, and extracts the first operation instruction from the user operation.

In the locked state, the electronic device 100 may periodically, or under a specific trigger condition, start to receive a user operation input by a user, and extract the first operation instruction from the user operation. A plurality of types of trigger conditions may be included. For example, the trigger conditions may include: after a voice assistant is started, after the electronic device 100 detects a wrist raising operation, and after the electronic device 100 detects an operation of tapping the display. Herein, the electronic device 100 may continuously run a wakeup phase recognition program with low power consumption, and start the voice assistant after detecting a wakeup phase. In this way, when the trigger condition is detected, the electronic device 100 starts to receive the user operation and extract the first operation instruction from the user operation, so that power consumption of the electronic device 100 can be reduced.

There may be a plurality of forms of user operations carrying the first operation instruction, for example, a voice carrying semantics, one or more images including a gesture/face expression/body posture/lip shape, a slide operation including a signature, a button pressing operation, and an operation of shaking the electronic device 100.

The electronic device 100 may use corresponding modules to receive the user operations that carry the first operation instruction. For example, the receiver 170B and the microphone 170C may be used to receive a voice carrying semantics, the display 194 may be used to receive a slide operation including a signature and a slide operation including a gesture, the camera 193 may be used to receive an image including a gesture/facial expression/body posture/lip shape, the button 190 may be used to receive a button pressing operation, and the gyroscope sensor 180B may be used to receive a shake operation.

Then, the electronic device 100 may identify or extract the first operation instruction from the received user operation. For example, the electronic device 100 may extract semantics from a voice, extract a gesture/face expression/body posture/lip shape from one or more images, and extract a signature or a gesture from a slide operation.

The electronic device 100 may identify, locally or via a network, the first operation instruction included in the user operation. For example, the electronic device 100 may locally identify semantics in a voice and a gesture/face expression/body posture or the like in an image by using the processor 110, or may upload a voice or an image to a network, and identify semantics in the voice and a gesture/face expression/body posture or the like in the image by using a network server or another device.

A voice carries semantics, and different voices may carry different semantics. The user may input different operation instructions by inputting different voices. For example, a voice "Navigate to home" may be used to request the electronic device to start a navigation application and navigate to home; and a voice "Open an album" may be used to request the electronic device to start a gallery application.

When the first operation instruction received by the electronic device 100 is a voice, the electronic device 100 needs to first start a voice assistant. The voice assistant is an application that is installed in the electronic device and that allows the user to control the electronic device by using a voice instruction. Generally, the voice assistant is in a sleep state. Before using the voice assistant, the user may first wake up or start the voice assistant. Only after the voice assistant is woken up, the electronic device can receive and identify the voice instruction input by the user. A voice used to wake up the voice assistant may be referred to as a wakeup phase. For example, the wakeup phase may be a voice "Hey E Hey E". In some other embodiments, the voice assistant in the electronic device 100 may be in a wakeup state for a long time, and does not need to be woken up by using a wakeup phase. The voice assistant is only a word used in this application, and may also be referred to as another term like a smart assistant. This is not limited herein.

The gesture may be a gesture of touching the electronic device, for example, a slide gesture or a tap gesture of touching the display. Alternatively, the gesture may be a hover gesture that does not touch the electronic device, for example, a palm opening gesture or a first holding gesture above the display. The hover gesture may also be referred to as an air gesture, a mid-air gesture, a remote gesture, or the like. The user may input different operation instructions by inputting different gestures. For example, a palm opening gesture above the display may be used to request the electronic device to start a navigation application and navigate to home; and a first holding gesture above the display may be used to request the electronic device to start a gallery application.

The facial expression may include, for example, a blinking expression and a mouth opening expression. The user may input different operation instructions by inputting different facial expressions.

The body posture may include, for example, nodding, shaking head, swinging an arm, and squatting. The user may input different operation instructions by inputting different body postures. For example, a body posture nodding may be used to request the electronic device to play music, and a body posture shaking head may be used to request the electronic device to pause playing music.

There may be a plurality of manners of pressing a button and shaking the electronic device. The user may press the button or shake the electronic device in different manners to input different operation instructions. For example, an operation of double-tapping a power button may be used to request the electronic device to play music, and an operation of shaking the electronic device twice may be used to request the electronic device to pause playing music.

Different lip shapes may be used to indicate different operations. For example, a change of a lip shape corresponding to a voice "Play music" within a period of time may be used to request the electronic device to play music. The first operation instruction is input by using a lip shape, so that the user can control the electronic device by using lips, thereby enriching use scenarios and use scopes of the electronic device.

This is not limited to the foregoing several user operations. The first operation instruction may be implemented in another form, for example, may be a snapping sound. This is not limited herein.

2. Another device sends indication information of a user operation to the electronic device 100, and the electronic device 100 extracts the first operation instruction from the indication information of the user operation.

The electronic device 100 may establish a communication connection to the another device like the electronic device 200. For a manner of establishing the communication connection between the electronic device 100 and the another electronic device, refer to the related descriptions in FIG. 3.

The user operation received by the another device carries the first operation instruction. An occasion, a manner, and the like of receiving, by the another device, the user operation that carries the first operation instruction are the same as the occasion, the manner, and the like of receiving, by the electronic device 100, the user operation that carries the first operation instruction in the foregoing first manner. For details, refer to the related descriptions.

The indication information that is of the user operation and that is sent by the another device may be the user operation itself, or may be other indication information of the user operation. For example, when the electronic device 200 is a headset connected to the electronic device 100, the electronic device 200 may receive a voice that includes semantics and that is input by the user, and then send the voice to the electronic device 100. For another example, when the electronic device 200 is a camera connected to the electronic device 100, the electronic device 200 may capture an image that includes a gesture/facial expression/body posture and that is input by the user, and then send the image to the electronic device 100. For another example, when the electronic device 200 is a smart band connected to the electronic device 100, the electronic device 200 may receive a pressing operation performed on the power button, and then send indication information of the pressing operation to the electronic device 100.

A manner in which the electronic device 100 extracts the first operation instruction from the indication information of the user operation is the same as the manner in which the electronic device 100 extracts the first operation instruction from the received user operation in the foregoing first manner. For details, refer to the related descriptions.

In the foregoing second case, the another device like the electronic device 200 may be considered as a peripheral device or an accessory device of the electronic device 100.

In the foregoing second manner, the electronic device 200 may select the electronic device 100 by default, or may send the indication information of the user operation to the electronic device 100 based on the electronic device 100 selected by the user. A manner in which the user selects the electronic device 100 is not limited, for example, through a voice or a selection operation on a user interface. For example, when the electronic device 200 is a headset, a received voice may be sent to the connected electronic device 100 by default. For another example, the electronic device 200 may detect a voice instruction "Play music with the mobile phone", and send the voice to the mobile phone (that is, the electronic device 100) mentioned in the voice instruction.

3. Another device receives a user operation that carries the first operation instruction, extracts the first operation instruction from the user operation, and sends the first operation instruction to the electronic device 100.

The electronic device 100 may establish a communication connection to the another device like the electronic device 200. For a manner of establishing the communication connection between the electronic device 100 and the another electronic device, refer to the related descriptions in FIG. 3.

The another device like the electronic device 200 may first receive the user operation that carries the first operation instruction, identify, from the user operation, the first operation instruction included in the user operation, and then send the first operation instruction to the electronic device 100. Herein, that the another device receives the user operation carrying the first operation instruction is similar to that the electronic device 100 receives the user operation carrying the first operation instruction in the foregoing first manner. For details, refer to the related descriptions. A manner in which the another device identifies, from the received user operation, the first operation instruction included in the user operation is the same as the manner in which the electronic device 100 identifies, from the user operation, the first operation instruction included in the user operation in the foregoing first manner. For details, refer to the related descriptions.

For example, the electronic device 200 may receive a voice input by the user, then identify semantics in the voice, and then send the semantics information to the electronic device 100. For another example, the electronic device 200 captures an image that includes a gesture/facial expression/body posture and that is input by the user, and may identify the gesture/facial expression/body posture in the image, and then send the gesture/facial expression/body posture information to the electronic device 100.

In the foregoing third manner, the electronic device 200 may select the electronic device 100 by default, or may send the first operation instruction to the electronic device 100 based on the electronic device 100 selected by the user.

The weak authentication factor is identity authentication information that does not meet an unlocking requirement of the electronic device. The identity authentication information may include password, graph, and biometric feature. For details about the identity authentication information, refer to the foregoing related descriptions.

In an embodiment of this application, the identity authentication information that does not meet the unlocking requirement of the electronic device, namely, the weak authentication factor, may include the following two types:

1. Identity authentication information that is lower than a standard required by a first authentication mode.

The first authentication mode is an identity authentication mode with a relatively high ACL. For a manner of determining an ACL, refer to the foregoing related descriptions. The first authentication mode may be preset by the electronic device or a producer of the electronic device. For details, refer to the foregoing related descriptions. For example, the first authentication mode may include password authentication, graphic authentication, fingerprint authentication, and face authentication.

The electronic device may prestore identity authentication information of the user for subsequent unlocking in the corresponding first authentication mode. For example, when the first authentication mode includes password authentication, the electronic device may prestore one or more passwords. When the first authentication mode includes graphic authentication, the electronic device may prestore one or more graphs. When the first authentication mode includes biometric feature authentication, the electronic device may prestore one or more biometric features, such as a fingerprint and a face.

Identity authentication information that meets the standard required by the first authentication mode may include, for example, a biometric feature whose matching degree with a password or a graph prestored in the electronic device, or a prestored biometric feature (for example, a fingerprint or a face) reaches a first value. After receiving the identity authentication information that meets the standard required by the first authentication mode of the electronic device, the electronic device may switch from the locked state to the unlocked state. The first value may be preset.

The identity authentication information that is lower than the standard required by the first authentication mode may include, for example, a biometric feature whose matching degree with a prestored biometric feature is lower than the first value, or a password or a graph whose similarity with a password or a graph prestored in the electronic device reaches a specific value.

In comparison with the identity authentication information that meets the standard required by the first authentication mode, the user may input the identity authentication information that is lower than the standard required by the first authentication mode without performing a complex operation or a plurality of operations. For example, the user may input a graph similar to a preset graph, align a face with a camera of the electronic device at a long distance without staying still, press a location of a fingerprint recognition sensor by using a finger with a water stain, or align a finger with a camera. It is clear that, in this way, a requirement for inputting identity authentication information by the user can be lowered, so that the user can use the electronic device more simply, conveniently, and easily.

2. identity authentication information that meets a standard required by a second authentication mode.

The second authentication mode is an identity authentication mode with a relatively low ACL. For a manner of determining an ACL, refer to the foregoing related descriptions. The second authentication mode may be preset by the electronic device or a producer of the electronic device. For details, refer to the foregoing related descriptions. For example, the second authentication mode may include voiceprint authentication, heart rate authentication, and body posture authentication.

The identity authentication information that meets the standard required by the second authentication mode may include, for example, a biometric feature whose matching degree with a biometric feature (for example, a voiceprint or a body posture) prestored in the electronic device reaches a second value. The second value may be preset.

Through the identity authentication information that meets the standard required by the second authentication mode, the user can control the electronic device more conveniently. For example, the user may control the electronic device by using a voice instruction, a body posture, or the like, and can control the electronic device without touching in scenarios such as driving, cooking, and exercise, thereby greatly facilitating the user.

In this embodiment of this application, there may be one or more weak authentication factors received by the electronic device 100. This is not limited herein. In other words, the electronic device 100 may receive a plurality of different weak authentication factors.

Similar to the first operation instruction, in this embodiment of this application, the electronic device may obtain the weak authentication factor in the following several manners:

1. The electronic device 100 directly receives a user operation that carries the weak authentication factor, and extracts the weak authentication factor from the user operation.

In the locked state, the electronic device 100 may periodically, or under a specific trigger condition, start to receive a user operation input by a user, and extract the weak authentication factor from the user operation. A plurality of types of trigger conditions may be included. For example, the trigger conditions may include: after a voice assistant is started, after the electronic device 100 detects a wrist raising operation, and after the electronic device 100 detects an operation of tapping the display. In this way, the electronic device 100 starts to collect the weak authentication factor when the trigger condition is detected, so that power consumption of the electronic device 100 can be reduced.

Herein, there may be a plurality of user operations carrying the weak authentication factor, for example, a user operation (for example, a tap operation) indicating a password, a user operation (for example, a slide operation) indicating a graph, an image carrying a biometric feature, and a slide operation.

The electronic device 100 may schedule corresponding modules to receive the user operations that carry the weak authentication factor. For example, the electronic device 100 may receive, by using the display 194, a user operation (for example, a tap operation) indicating a password and a user operation (for example, a slide operation) indicating a graph, collect, by using the camera 193, an image including a biometric feature (for example, a face, an iris, a retina, a face shape, or a body posture), collect, by using the fingerprint sensor 180H, a fingerprint input by the user, collect, by using the receiver 170B and the microphone 170C, a voice that carries a voiceprint and that is input by the user, and collect a heart rate by using the optical sensor.

Then, the electronic device 100 may identify, from the received user operation, the weak authentication factor included in the user operation. For example, a voiceprint is extracted from a voice, a password is extracted from a tap operation, a graph or a signature is extracted from a slide operation, and a face, an iris, a retina, a face shape, a body posture, or a fingerprint is extracted from an image.

The electronic device 100 may identify, locally or via a network, the weak authentication factor included in the user operation. For example, the electronic device 100 may locally identify a voiceprint in a voice and a body posture, a face type, or the like in an image by using the processor 110, directly identify a button pressing operation by using a button, and identify a fingerprint or the like by using the fingerprint sensor 180H, or upload a voice or an image to a network, and identify a voiceprint in a voice and a body posture, a face shape, or the like in an image by using a network server or another device.

2. Another device sends indication information of a user operation to the electronic device 100, and the electronic device wo extracts the weak authentication factor from the indication information of the user operation.

The electronic device 100 may establish a communication connection to the another device like the electronic device 200. For a manner of establishing the communication connection between the electronic device 100 and the another electronic device, refer to the related descriptions in FIG. 3.

The user operation received by the another device carries the weak authentication factor. An occasion, a manner, and the like of receiving, by the another device, the user operation that carries the weak authentication factor are the same as the occasion, the manner, and the like of receiving, by the electronic device 100, the user operation that carries the weak authentication factor in the foregoing first manner. For details, refer to the related descriptions.

The indication information that is of the user operation and that is sent by the another device may be the user operation itself, or may be other indication information of the user operation. For example, the another device may capture a user operation (for example, a tap operation) indicating a password, a user operation (for example, a slide operation) indicating a graph, an image carrying a biometric feature, or a slide operation, and then send indication information of the tap operation or the slide operation or the image to the electronic device 100, so that the electronic device 100 identifies the weak authentication factor therein.

A manner in which the electronic device 100 extracts the weak authentication factor from the indication information of the user operation is the same as the manner in which the electronic device 100 extracts the weak authentication factor from the received user operation in the foregoing first manner. For details, refer to the related descriptions.

In the foregoing second case, the another device like the electronic device 200 may be considered as a peripheral device or an accessory device of the electronic device 100.

In the foregoing second manner, the electronic device 200 may select the electronic device 100 by default, or may send the indication information of the user operation to the electronic device 100 based on the electronic device 100 selected by the user.

3. Another device receives a user operation that carries the weak authentication factor, extracts the weak authentication factor from the user operation, and sends the weak authentication factor to the electronic device 100.

The electronic device 100 may establish a communication connection to the another device like the electronic device 200. For a manner of establishing the communication connection between the electronic device 100 and the another electronic device, refer to the related descriptions in FIG. 3.

The another device like the electronic device 200 may first receive the user operation that carries the weak authentication factor, identify, from the user operation, the weak authentication factor included in the user operation, and then send the weak authentication factor to the electronic device 100. Herein, that the another device receives the user operation carrying the weak authentication factor is similar to that the electronic device 100 receives the user operation carrying the weak authentication factor in the foregoing first manner. For details, refer to the related descriptions. A manner in which the another device identifies, from the received user operation, the weak authentication factor included in the user operation is the same as the manner in which the electronic device 100 identifies, from the user operation, the weak authentication factor included in the user operation in the foregoing first manner. For details, refer to the related descriptions.

For example, the electronic device 200 may receive a voice input by the user, then identify a voiceprint of the voice, and then send the voiceprint information to the electronic device 100. For another example, the electronic device 200 captures an image that includes a biometric feature (for example, a face, a fingerprint, a palm shape, a retina, an iris, a body posture, or a face shape) and that is input by the user, and may identify the biometric feature included in the image, and then send the biometric feature information to the electronic device 100.

In the foregoing third manner, the electronic device 200 may select the electronic device 100 by default, or may send the weak authentication factor to the electronic device 100 based on the electronic device 100 selected by the user.

In some embodiments of this application, the electronic device 100 may separately receive the first operation instruction and the weak authentication factor. For example, the electronic device 100 may first capture a voice instruction "Play music" by using a microphone, and then capture a face image by using a camera.

In some embodiments of this application, the electronic device 100 may simultaneously receive the first operation instruction and the weak authentication factor. In this way, user operations can be simplified and user experience is better.

Figures 5B, 5C, 5D:
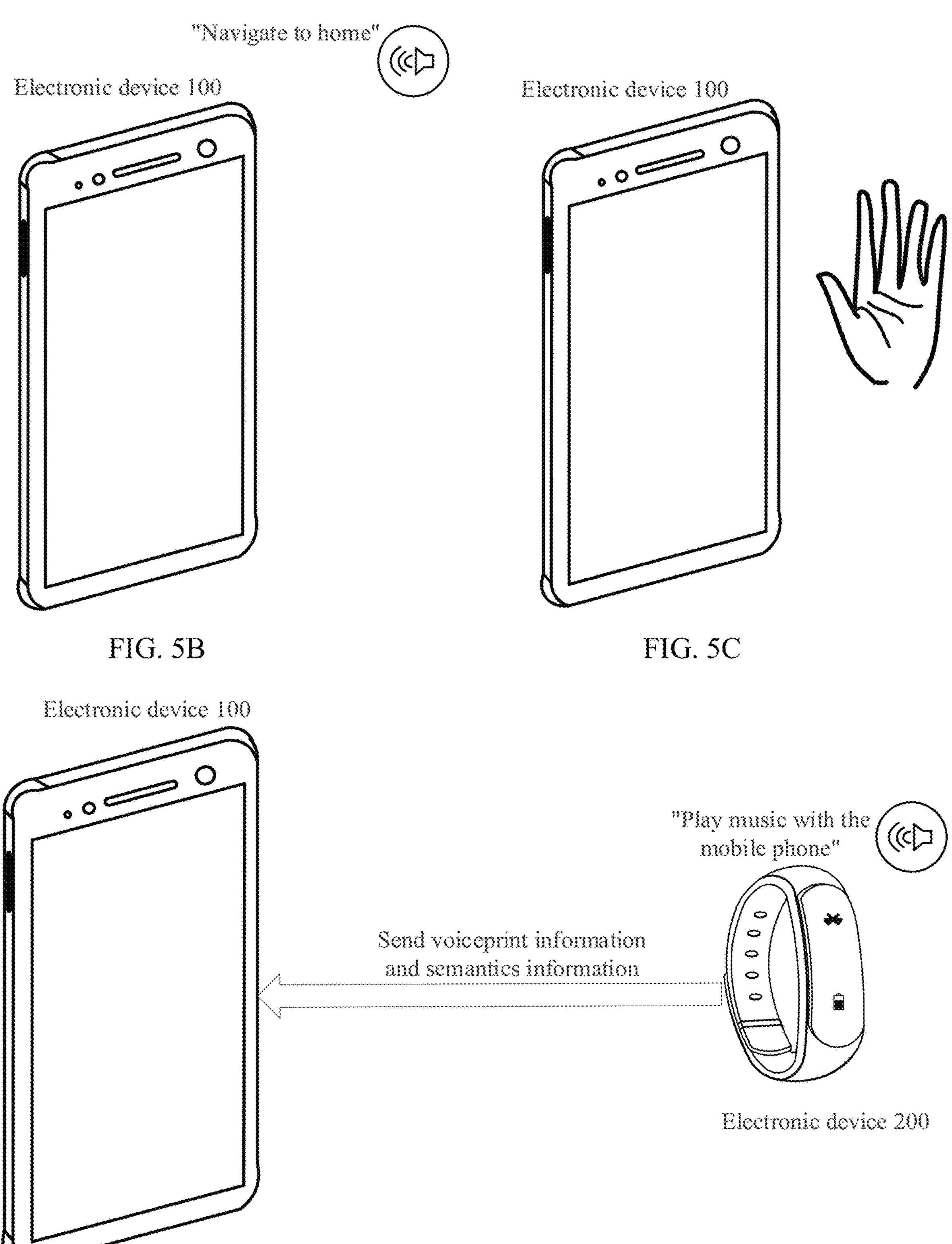
FIG. 5B to FIG. 5D show scenarios of an electronic device 100 according to an embodiment of this application.

FIG. 5B to FIG. 5D separately show scenarios in which the electronic device 100 simultaneously receives the first operation instruction and the weak authentication factor. In FIG. 5B to FIG. 5D, the electronic device 100 is in the locked state.

For example, FIG. 5B shows an example of a scenario in which the electronic device 100 (for example, a mobile phone) simultaneously receives the first instruction and the weak authentication factor. As shown in FIG. 5B, the electronic device 100 may capture a voice instruction "Navigate to home" by using a microphone, where the voice instruction carries a voiceprint. The electronic device 100 may further identify corresponding semantics by using the voice instruction. A first resource that the semantics requests to access includes a navigation application and an address of "home".

For example, FIG. 5C shows an example of another scenario in which the electronic device 100 (for example, a mobile phone) simultaneously receives the first instruction and the weak authentication factor. As shown in FIG. 5C, the electronic device 100 may capture, by using a camera, an image including a palm opening gesture, and the electronic device 100 may identify the palm opening gesture in the gesture image, and may further identify a feature (for example, a fingerprint or a finger size) of the palm. The palm opening gesture may be used to request the electronic device 100 to "Navigate to home", and a first resource that the palm opening gesture requests to access includes a navigation application and an address of "home".

For example, FIG. 5D shows another scenario in which the electronic device 100 (for example, a smart band) simultaneously receives the first instruction and the weak authentication factor. As shown in FIG. 5D, the electronic device 200 may capture a voice instruction "Play music with the mobile phone" by using a microphone, where the voice instruction carries a voiceprint. The electronic device 200 may identify the voiceprint corresponding to the voice instruction, and may further identify semantics corresponding to the voice instruction, and then simultaneously send the semantics information and the voiceprint information to the electronic device 100. Herein, a first resource that the semantics requests to access includes a music application.

This is not limited to the several scenarios shown in FIG. 5B to FIG. 5D. During specific implementation, the electronic device 100 may receive the first operation instruction and the weak authentication factor in another form. For details, refer to the foregoing related descriptions. Details are not listed herein again.

Step S102: The electronic device 100 creates a limited execution environment based on the first operation instruction and the weak authentication factor.

The limited execution environment is an execution environment that is restricted. The execution environment may include a hardware environment and a software environment. The execution environment may be a sandbox, or may be a function field including a plurality of functions. In the limited execution environment, the electronic device can perform only a part of specified operations, and cannot perform an operation other than the part of specified operations. In other words, in the limited execution environment, the electronic device can access only a part of resources of the electronic device, and cannot access a resource other than the part of resources.

In an embodiment of this application, a policy for the electronic device 100 to create the limited execution environment based on the first operation instruction and the weak authentication factor is not limited. For example, the electronic device 100 may create the limited execution environment based on a type of the first operation instruction and an environment in which the weak authentication factor is collected. For example, when the first operation instruction is semantics carried in a voice, a gesture, a facial expression, a signature, and a body posture, quantities of operations that can be performed in limited execution environments separately created by the electronic device 100 decrease sequentially.

In some embodiments of this application, the electronic device 100 may create the limited execution environment based on a risk level of an operation corresponding to the first operation instruction and/or a security level of the weak authentication factor. Step S102 may specifically include the following steps S1021 to S1024.

When the electronic device 100 receives a plurality of authentication factors, the plurality of authentication factors may be received sequentially. For example, the user may separately input five voice sentences, and the electronic device 100 may extract one voiceprint from each voice sentence as the weak authentication factor.

Step S1021: The electronic device 100 determines the risk level of the operation corresponding to the first operation instruction.

First, the electronic device 100 may first determine the operation corresponding to the first operation instruction.

A correspondence between the first operation instruction and an operation that the first operation instruction requests the electronic device 100 to perform may be preset by the electronic device 100. This is not limited herein.

Specifically, operations separately corresponding to different first operation instructions (including semantics, a gesture, a facial expression, a body posture, and the like) may be preset. For example, semantics "Navigate to home" or a palm opening gesture above the display corresponds to starting a navigation application and navigating to home; semantics "Play music with the mobile phone" corresponds to starting a music application; semantics "Open an album" or a first holding gesture above the display corresponds to starting a gallery application; a body posture nodding corresponds to playing music; and a body posture shaking head corresponds to pausing playing music. The preset correspondences between different semantics, gestures, facial expressions, and body postures and operations may be stored in the electronic device 100, or may be stored in the network server. This is not limited herein.

The electronic device 100 finds the operation corresponding to the first operation instruction locally or in the network based on preset information.

The operation corresponding to the first operation instruction includes an access operation performed on a resource, where the resource is one or more resources in the electronic device, and the access operation may include, for example, one or more of reading, adding, deleting, writing, modifying, and execution. For determining of specific content of the resource and the access operation, refer to the foregoing related descriptions. Resources in the electronic device may include a software resource, a hardware resource, a peripheral, a peripheral resource, or the like. For details, refer to the foregoing related descriptions.

Then, the electronic device 100 may first determine the risk level of the operation corresponding to the first operation instruction.

In an embodiment of this application, the electronic device 100 may prestore risk levels corresponding to different operations.

In this embodiment of this application, operations that can be performed by the electronic device 100 may be classified into different risk levels based on different granularities. The granularity is not limited in this application. For example, risk levels of operations may be roughly classified into three levels: high, medium, and low. For another example, risk levels of operations may be classified into levels 1 to 10. If a value is larger, a risk level of an operation is higher.

In this embodiment of this application, when a risk of privacy disclosure to the user when the electronic device 100 performs an operation is higher, a risk level of the operation is higher. When privacy of a resource that an operation requests to access is higher, severity of a risk of privacy disclosure to the user when the operation is performed is higher, and a risk level of the operation is also higher. For example, risks of viewing a photo, viewing a shopping history, and viewing a browsing history in a browser may decrease sequentially. When privacy of an access operation required by an operation is higher, a risk level of the corresponding operation is higher. For example, risks of reading a photo, deleting a photo, and adding a photo may decrease sequentially.

In some embodiments of this application, the electronic device 100 may autonomously set risk levels corresponding to different operations. For example, the electronic device 100 may set risk levels of different operations by considering factors such as a type and a location of a resource that an operation requests to access. For example, a risk level of an operation that requests to access a third-party resource is higher than a risk level of an operation that requests to access a system resource; and a risk level of an operation performed at home is lower than a risk level of an operation performed at another place.

In some other embodiments of this application, the electronic device 100 may alternatively set risk levels corresponding to different operations based on user requirements. Specifically, the electronic device 100 may determine or set, in response to the received user operation, a risk level of each operation that can be performed by the electronic device 100. For example, the electronic device 100 provides a user interface in a setting application, so that the user sets the risk level of each operation.

In some other embodiments of this application, the risk level of the operation corresponding to the first operation instruction may be alternatively determined based on a manner of obtaining the first operation instruction. For example, when the electronic device 100 obtains the first operation instruction in the foregoing first to third manners, security levels of the obtained first operation instructions decrease sequentially. In other words, a security level of the first operation instruction obtained by the electronic device 100 in the first manner is higher than that of the first operation instruction obtained in the second or third manner. For another example, when receiving the first operation instruction sent by the electronic device 200, the electronic device 100 may determine the risk level of the operation corresponding to the first operation instruction based on the electronic device 200. For example, if frequency of historical communication between the electronic device 200 and the electronic device 100 is higher, the risk level of the operation corresponding to the first operation instruction is lower.

Step S1022: The electronic device 100 determines the security level of the weak authentication factor.

In this embodiment of this application, weak authentication factors may be classified into different security levels based on different granularities. The granularity is not limited in this application. For example, security levels of weak authentication factors may be roughly classified into three levels: high, medium, and low. For another example, security levels of weak authentication factors may be classified into levels 1 to 10. If a value is larger, a security level of a weak authentication factor is higher.

In this embodiment of this application, the security level of the weak authentication factor may be determined based on an ACL of an identity authentication mode of the weak authentication factor. If the ACL of the identity authentication mode of the weak authentication factor is higher, the security level of the weak authentication factor is higher.

In some other embodiments of this application, the security level of the weak authentication factor may be alternatively determined based on one or more of the following: a matching degree between the weak authentication factor and prestored identity authentication information, information about an environment in which the weak authentication factor is received, a manner of obtaining the weak authentication factor, or strength of a corresponding voice when the weak authentication factor is a voiceprint.

If the matching degree between the weak authentication factor and the prestored identity authentication information is higher, or the environment in which the weak authentication factor is received is quieter, or the strength of the corresponding voice when the weak authentication factor is a voiceprint is stronger, the security level of the weak authentication factor is higher.

When the electronic device 100 obtains the weak authentication factor in the foregoing first to third manners, security levels of the weak authentication factors decrease sequentially. In other words, a security level of the weak authentication factor obtained by the electronic device 100 in the first manner is higher than that of the weak authentication factor obtained in the second or third manner.

After performing S1022, the electronic device 100 may record the identity authentication mode of the weak authentication factor, the security level of the weak authentication factor, and an authentication validity period of the weak authentication factor. The authentication validity period of the weak authentication factor may be preset by the electronic device. For example, the authentication validity period may be set to a fixed value, for example, becomes invalid after the limited execution environment is created.

A sequence of S1021 and S1022 is not limited in embodiments of this application.

Optional step S1023: The electronic device 100 determines, based on the risk level of the operation corresponding to the first operation instruction and the security level of the weak authentication factor, whether the operation corresponding to the first operation instruction is allowed to be performed.

Specifically, the electronic device 100 presets operations that are allowed to be performed by the electronic device 100 in the case of risk levels of different operations and security levels of different authentication factors. The setting may be preset by the user or a producer of the electronic device 100. A correspondence between a risk level of an operation, a security level of an authentication factor, and an operation that is allowed to be performed by the electronic device 100 is not limited in embodiments of this application.

For example, when the risk level of the operation corresponding to the first operation instruction is relatively high or the security level of the weak authentication factor is relatively low, the operation corresponding to the first operation instruction is not allowed to be performed. For another example, when the risk level of the operation corresponding to the first operation instruction is relatively low or the security level of the weak authentication factor is relatively high, the operation corresponding to the first operation instruction is allowed to be performed.

In some embodiments, the electronic device 100 may match the risk level of the operation corresponding to the first operation instruction with the security level of the weak authentication factor, to determine whether the operation corresponding to the first operation instruction is allowed to be performed. Specifically, the electronic device 100 may preset a security level of a weak authentication factor for performing each operation. If a risk level of an operation is higher, a security level of a weak authentication factor required for performing the operation is higher.

If an execution result of S1023 is yes, the electronic device 100 continues to perform a subsequent step.

If an execution result of S1023 is no, the electronic device 100 does not continue to perform a subsequent step.

In some embodiments, if the execution result of S1023 is no, the electronic device 100 may further output prompt information, where the prompt information may be used to prompt the user that the operation corresponding to the first operation instruction is not allowed to be performed currently.

In some embodiments, the prompt information may further prompt the user of a reason why the operation corresponding to the first operation instruction is not allowed to be performed currently. For example, the prompt information may include that the risk level of the operation corresponding to the first operation instruction is relatively high or the security level of the weak authentication factor is relatively low.

In some embodiments, the prompt information may further prompt the user of a solution. For example, the user is prompted to input a weak authentication factor with a higher security level, or the user is prompted to perform unlocking. This is not limited herein.

An implementation form of the prompt information is the same as an implementation form of prompt information in subsequent step S105. For details, refer to related descriptions in the subsequent step.

Step S1024: The electronic device 100 creates the limited execution environment based on the risk level of the operation corresponding to the first operation instruction and the security level of the weak authentication factor.

In some embodiments, the electronic device 100 may perform S1024 after receiving the weak authentication factor of the predefined value. In other words, the electronic device 100 may create the limited execution environment by using a plurality of weak authentication factors.

If the risk level of the operation corresponding to the first operation instruction is lower or the security level of the weak authentication factor is higher, the electronic device 100 is allowed to perform more operations. Herein, an operation that is allowed to be performed by the electronic device 100 is an operation that can be performed in the limited execution environment created by the electronic device 100.

The electronic device 100 presets operations that are allowed to be performed by the electronic device 100 in the case of risk levels of different operations and security levels of different authentication factors. The setting may be preset by the user or a producer of the electronic device 100. A correspondence between a risk level of an operation, a security level of an authentication factor, and an operation that is allowed to be performed by the electronic device 100 is not limited in embodiments of this application. When receiving a same first operation instruction and different weak authentication factors, the electronic device may create different limited execution environments. When receiving different first operation instructions and a same weak authentication factor, the electronic device may also create different limited execution environments.

In some embodiments, regardless of the risk level of the operation corresponding to the first operation instruction or the security level of the weak authentication factor, a predefined operation in the locked state can be performed in the limited execution environment created by the electronic device 100.

For example, Table 1 shows examples of operations that are allowed to be performed by the electronic device 100 in the case of risk levels of different operations and security levels of different authentication factors. The risk levels of the operations and the security levels of the different authentication factors are classified into levels 1 to 5. If a value is larger, a risk level of an operation is higher and a security level of a weak authentication factor is higher.

TABLE 1

| Risk levels of operations | Security levels of authentication factors | Allowed operations |
|---|---|---|
| 2 | 1 | Start a camera application, turn on a flashlight, start a calculator, scan a two-dimensional code, disable/enable Bluetooth, disable/enable a cellular signal, and enable/disable a Wi-Fi signal. Start a navigation application but not read user data, open a browser but not read a browsing history, start a video application but not read a browsing history. |
| 2 | 4 | Start a camera application, turn on a flashlight, start a calculator, scan a two-dimensional code, disable/enable Bluetooth, disable/enable a cellular signal, and enable/disable a Wi-Fi signal. Start a navigation application and read user data, open a browser and read a browsing history, and start a video application and read a browsing history. |
| 1 | 4 | Start a camera application, turn on a flashlight, start a calculator, scan a two-dimensional code, |

TABLE 1-continued

| Risk levels of operations | Security levels of authentication factors | Allowed operations |
|---|---|---|
| | | disable/enable Bluetooth, disable/enable a cellular signal, and enable/disable a Wi-Fi signal. Start a navigation application and read user data, open a browser and read a browsing history, and start a video application and read a browsing history. View a photo, delete a photo, share a photo, and read an address book. |

Specifically, when the limited execution environment is created, the electronic device 100 may record operations that are determined based on the risk levels of the operations and the security levels of the different authentication factors and that are allowed to be performed by the electronic device 100. In other words, the electronic device wo records specific access operations that are allowed to be performed on which resources or which type of resources by the electronic device 100.

In some embodiments, if the electronic device wo has currently created a limited execution environment, the electronic device 100 may change the current limited execution environment to the foregoing described limited execution environment based on the risk levels of the operations and the security levels of the different authentication factors. Specifically, the electronic device wo may change recorded information to change the current limited execution environment. For details, refer to the foregoing related descriptions.

In some embodiments, the electronic device 100 may further create the limited execution environment by considering a quantity of weak authentication factors obtained in S101. For example, if the quantity of weak authentication factors obtained in S101 is larger, more operations are allowed to be performed in the created limited execution environment.

In some embodiments, if the electronic device 100 performs S1023, the operation corresponding to the first operation instruction is definitely allowed to be performed in the limited execution environment created in S1024. In this way, an effective limited execution environment can be created, and a waste of resources in the electronic device 100 can be reduced.

In some other embodiments, the electronic device 100 may directly perform S1024 without performing S1023. In this case, the operation corresponding to the first operation instruction is not necessarily allowed to be performed in the limited execution environment created in step S1024.

S103: The electronic device 100 performs the operation corresponding to the first operation instruction in the created limited execution environment in response to the first operation instruction.

In some embodiments, if the electronic device does not perform S1023, before S103, the electronic device 100 further needs to determine whether the operation corresponding to the first operation is allowed to be performed in the created limited execution environment, and if a determining result is yes, performs S103. If a determining result is no, the electronic device 100 may stop performing any step, or the electronic device 100 may perform another operation approximate to the operation corresponding to the first operation instruction in the limited execution environment in response to the first operation instruction as much as possible.

For the operation corresponding to the first operation instruction, refer to the detailed descriptions of S101 and S1021.

Figure 5E:
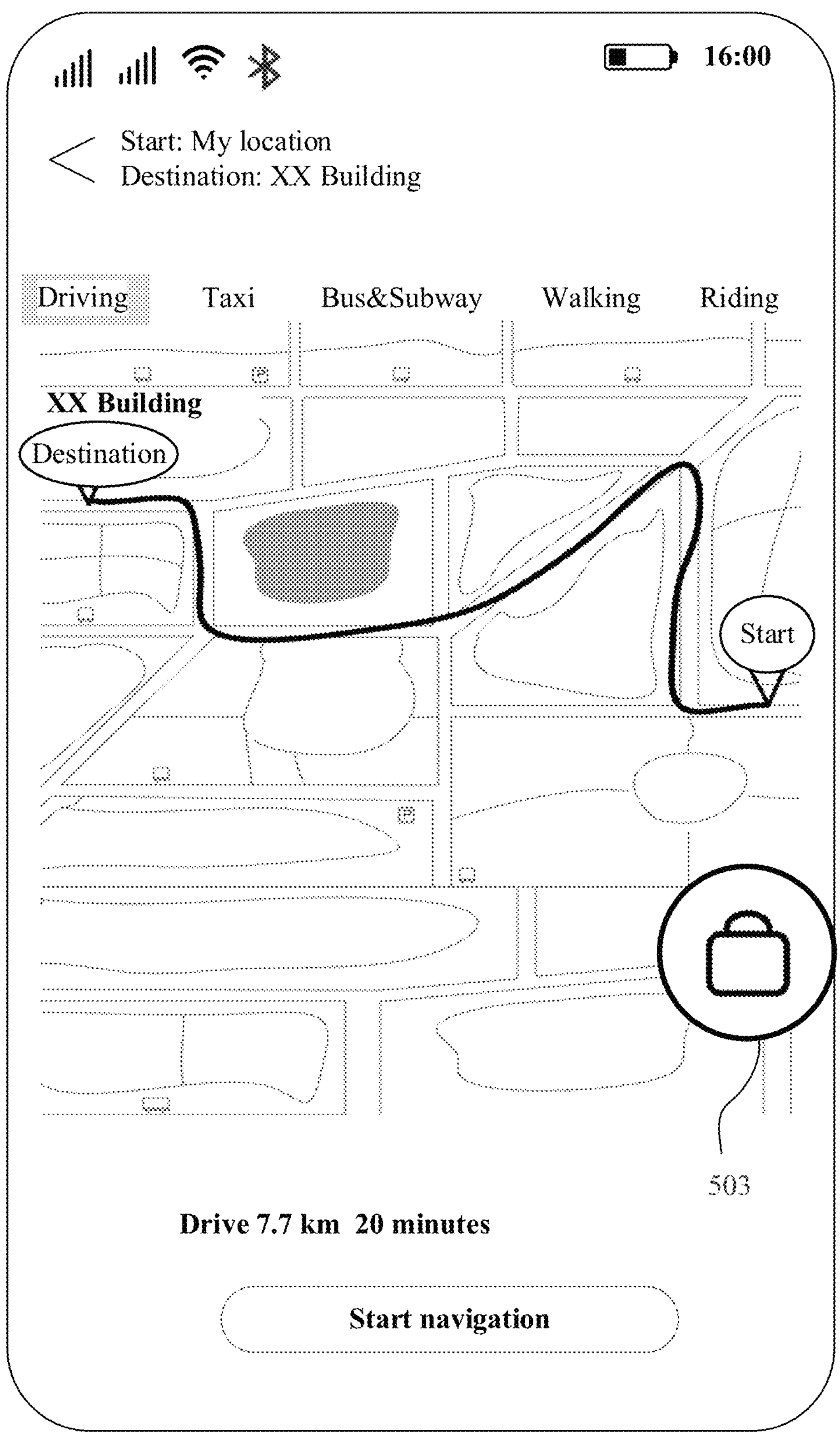
FIG. 5E to FIG. 5G show user interfaces displayed after an electronic device 100 creates a limited execution environment according to an embodiment of this application.
Figure 5F:
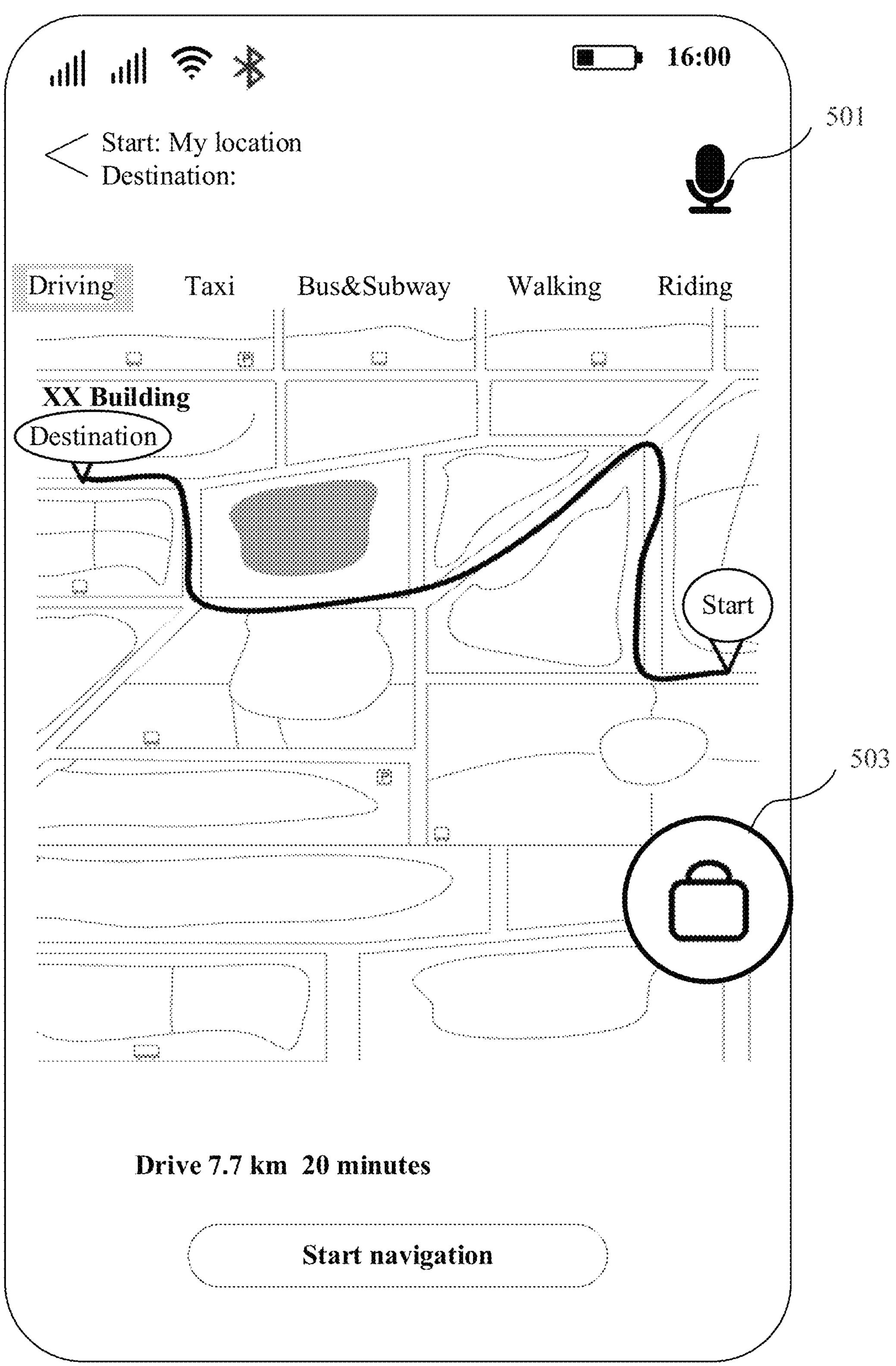

FIG. 5E to FIG. 5F show examples of user interfaces displayed when the electronic device 100 performs S103.

FIG. 5E shows a user interface 53 displayed after the electronic device 100 receives a voice instruction "Navigate to home" in FIG. 5B and receives a weak authentication factor (that is, a voiceprint carried in the voice instruction). As shown in FIG. 5E, the electronic device 100 is allowed to start a navigation application and read user data of the navigation application based on a limited execution environment created based on the voice instruction and the weak authentication factor, for example, reading a detailed address "XX building" of the user's "home". Therefore, on a navigation interface provided in FIG. 5E, the electronic device 100 automatically fills the detailed address of "home" at a destination.

FIG. 5F may show a user interface displayed after the electronic device 100 receives an image including a palm opening gesture in FIG. 5C and receives a weak authentication factor (that is, a feature of the palm like a fingerprint or a finger size). The palm opening gesture and the voice instruction "Navigate to home" are the same and are used to request the electronic device 100 to navigate to a location of "home". However, because a security level of the weak authentication factor received by the electronic device 100 in FIG. 5C is lower than a security level of the weak authentication factor received by the electronic device 100 in FIG. 5B, the electronic device 100 creates a limited execution environment based on the palm opening gesture and the weak authentication factor, and is allowed to start the navigation application but is not allowed to read the user data of the navigation application. As shown in FIG. 5F, because the electronic device 100 cannot read the detailed address of "home", no address is filled at the destination. The user may manually input the address of "home" at the destination to navigate to home.

Optional step S104: The electronic device 100 receives a user operation.

A form of the user operation received by the electronic device 100 in S104 is not limited in embodiments of this application. For example, the user operation may be a voice carrying semantics, an image including a gesture/face expression/body posture, a slide operation including a signature, a button pressing operation, or an operation of shaking the electronic device 100. A manner in which the electronic device 100 receives the user operation in S104 is the same as the first manner in which the electronic device 100 receives the user operation that carries the first operation instruction in S101. For details, refer to the related descriptions.

Optional step S105: If an operation that the user operation requests the electronic device 100 to perform is allowed to be performed in the created limited execution environment, the electronic device 100 responds to the user operation; or if the operation that the user operation requests the electronic device 100 to perform is not allowed to be performed, outputs prompt information, where the prompt information is used to prompt the user that the operation corresponding to the user operation is not allowed to be performed currently.

Herein, that the electronic device 100 determines the operation that the user operation requests the electronic device 100 to perform is the same as that the electronic device 100 determines the operation corresponding to the first operation instruction in S1021. For details, refer to the related descriptions.

In an embodiment of this application, a resource that the user operation requests to access in S104 may be referred to as a second resource. The second resource may include one or more resources. This is not limited herein.

Specifically, if the operation corresponding to the user operation in S104 is allowed to be performed in the limited execution environment, the electronic device 100 responds to the user operation, and performs the operation that the user operation requests the electronic device 100 to perform.

For example, if the user operation in S104 is used to request the electronic device 100 to start a camera application, and the limited execution environment allows the electronic device 100 to start the camera application, the electronic device 100 may start the camera application.

For another example, as shown in FIG. 5F, after the electronic device 100 detects a user operation (for example, a tap operation) on a control 501 on the user interface 53, if the electronic device 100 is allowed to invoke a microphone in the limited execution environment, the electronic device 100 may enable the microphone to collect a voice input by the user.

If the operation corresponding to the user operation is not allowed to be performed in the limited execution environment, the electronic device 100 does not respond to the user operation, and outputs prompt information.

For example, if the user operation (for example, an upward slide operation from the bottom of the display) in S104 is used to request the electronic device 100 to display a home screen, and the electronic device 100 is not allowed to display the home screen in the limited execution environment, the electronic device 100 may output prompt information.

In some embodiments, the prompt information output by the electronic device 100 may further prompt the user of a reason why the operation corresponding to the user operation is not allowed to be performed currently, for example, a risk level of the user operation is relatively high, or a security level of the weak authentication factor currently received by the electronic device 100 is relatively low.

In some embodiments, the prompt information output by the electronic device 100 may further prompt the user of a solution. For example, the user is prompted to input a weak authentication factor with a higher security level, or the user is prompted to perform unlocking. This is not limited herein.

An implementation form of the prompt information may be a visual element, a vibration signal, a flash signal, audio, or the like. This is not limited herein.

Figure 5G:
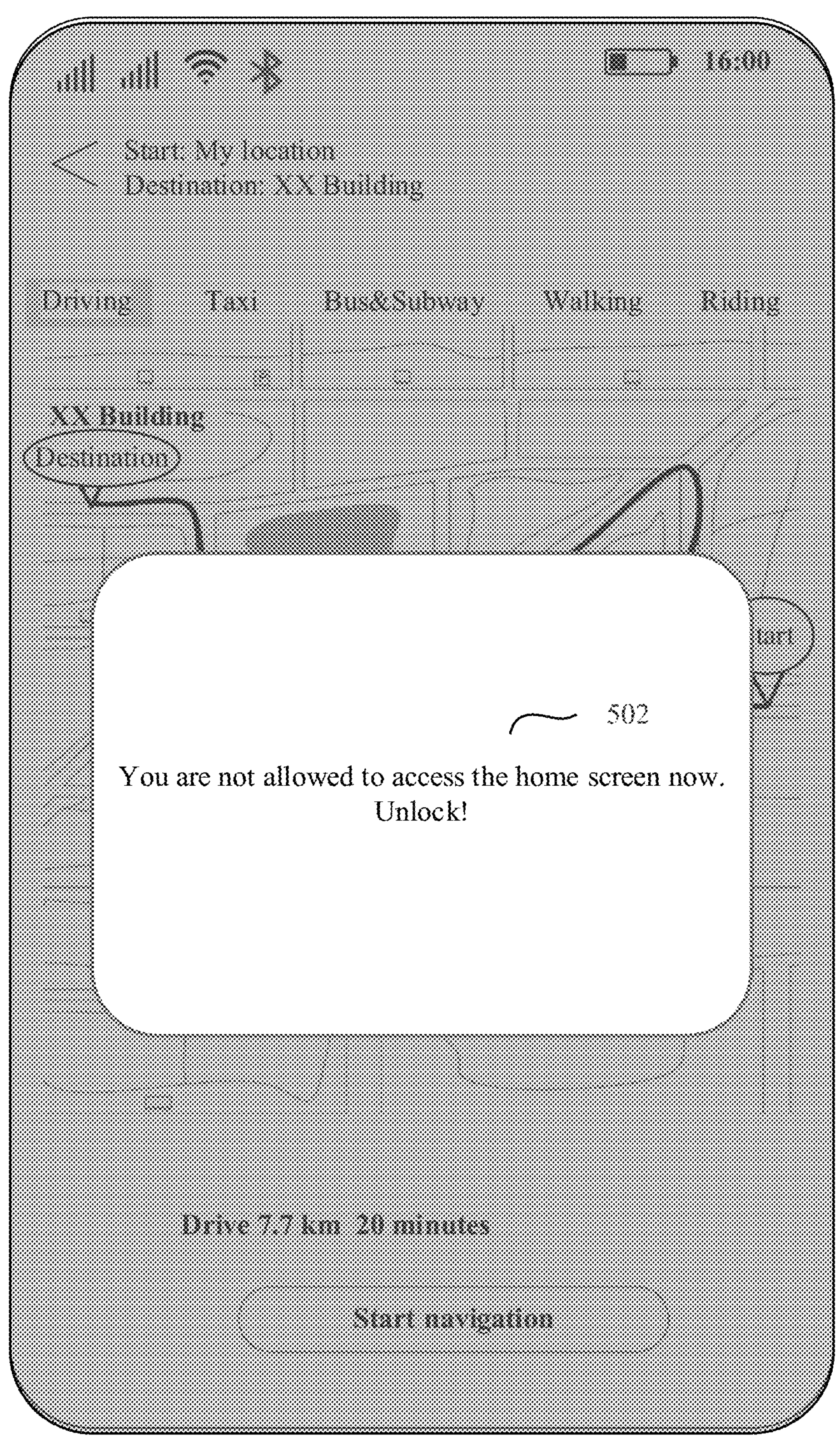

For example, FIG. 5G shows an example of prompt information 502 output by the electronic device 100.

Through S105, an operation that can be performed by the electronic device 100 may be limited to a range of the limited execution environment, thereby avoiding expansion of permission and protecting data security of the electronic device 100.

Optional step S106: The electronic device 100 obtains a strong authentication factor, and switches from the locked state to the unlocked state.

Specifically, the strong authentication factor includes identity authentication information that meets the standard required by the first authentication mode. For the identity authentication information that meets the standard required by the first authentication mode, refer to the detailed descriptions in S101. Details are not described herein again.

In some embodiments, the strong authentication factor may alternatively include a plurality of weak authentication factors obtained within a period of time. Herein, a specific quantity of the plurality of weak authentication factors may be preset, and is not limited herein. The plurality of weak authentication factors may be same identity authentication information or different identity authentication information. In other words, the user may complete identity authentication by inputting weak authentication factors for a plurality of times. For example, the user may continuously input a plurality of voice sentences. In this way, after extracting a plurality of voiceprints (that is, weak authentication factors), the electronic device 100 may complete unlocking. For another example, the electronic device 100 may simultaneously extract a voiceprint and a long-distance face, and then perform unlocking.

For a manner in which the electronic device 100 obtains the strong authentication factor, refer to the manner in which the electronic device 100 obtains the weak authentication factor in S101. Details are not described herein again.

In some embodiments, after outputting the prompt information in S105, the electronic device 100 may automatically start to detect the strong authentication factor input by the user. After viewing the prompt information output by the electronic device 100, the user may input the strong authentication factor.

In some other embodiments, the electronic device 100 may start, in response to the received user operation at any time point after S103 is performed, to detect the strong authentication factor input by the user. The user may input the strong authentication factor after inputting the user operation. A form of the user operation is not limited in embodiments of this application.

For example, referring to FIG. 5E and FIG. 5F, after creating the limited execution environment, the electronic device 100 may continuously display an unlocking control 503 on a displayed access control interface. As shown in FIG. 5E and FIG. 5F, in response to an operation performed on the unlocking control 503, the electronic device 100 may start to detect the strong authentication factor input by the user. In addition, the unlocking control 503 may be further configured to prompt the user that the electronic device 100 is currently in the limited execution environment and is still in the locked state, to avoid a user operation beyond a range of the limited execution environment of the user.

Implementation of the unlocking control 503 is not limited in embodiments of this application. For example, the unlocking control 503 may be an icon, a text, or another form, and may be transparent or opaque. The unlocking control 503 may be displayed at any position in the display, may be displayed in a fixed area, or may be dragged by the user. This is not limited herein.

In an embodiment of this application, the unlocking control 503 may be referred to as a first control.

Optional step S107: The electronic device 100 disables the limited execution environment.

In some embodiments, after S106, the electronic device 100 may disable the limited execution environment after switching to the unlocked state.

In some other embodiments, the electronic device 100 may disable the limited execution environment after receiving an operation used to close the started application corresponding to the first operation instruction. That the user triggers the electronic device 100 to close the started application corresponding to the first operation instruction indicates that the user currently does not need the limited execution environment any more. Therefore, the electronic device 100 disables the limited execution environment, so that device resources can be saved.

During specific implementation, that the electronic device 100 disables the limited execution environment means that the electronic device 100 deletes information recorded in S102, for example, recorded operations that are allowed to be performed by the electronic device 100 in the limited execution environment.

According to the weak authentication factor-based access control method shown in FIG. 4, the electronic device no longer determines, based on only whether the electronic device is unlocked, whether to respond to and perform a corresponding operation, but determines, based on a risk level of an operation instruction and a security level of a weak authentication factor, whether to perform the operation. In this way, finer-grained access control can be implemented, thereby enriching use scenarios and use scopes of the electronic device. For the user, the electronic device may be triggered to perform an operation other than the predefined operation in the locked state without performing complex authentication to unlock the electronic device, so that the user can control the electronic device more easily and conveniently. In addition, the electronic device no longer simply classifies resources into a resource accessible through a predefined operation and a resource accessible through another operation, and further implements fine-grained access control for various types of resources.

Figure 6:
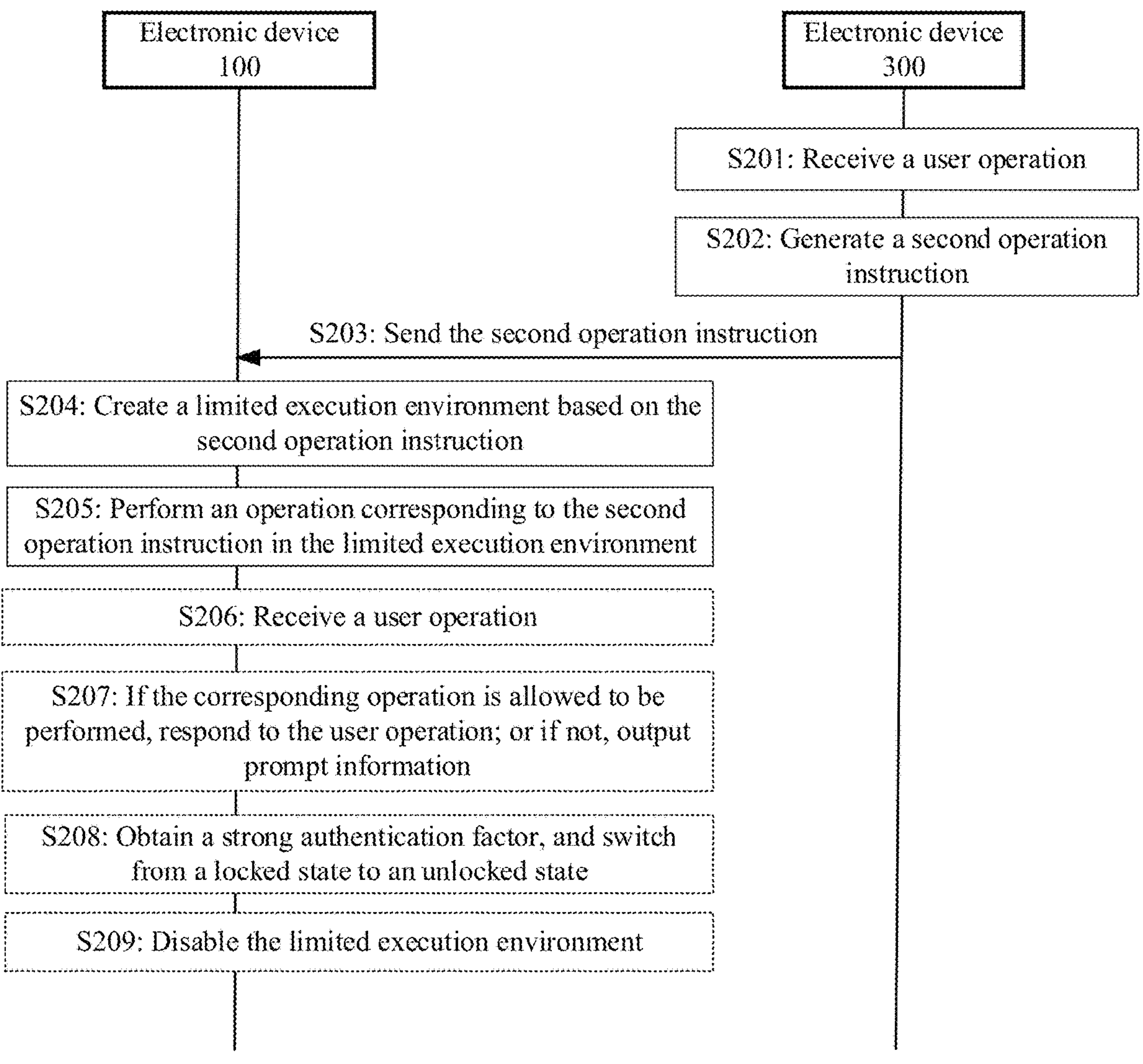
FIG. 6 is a flowchart of a cross-device access control method according to an embodiment of this application.

FIG. 6 is a schematic flowchart of a cross-device access control method according to an embodiment of this application.

As shown in FIG. 6, the method may include the following steps.

Step S201: An electronic device 300 receives a user operation, where the user operation is used to request an electronic device 100 to perform an operation.

A form of the user operation in S201 is not limited in embodiments of this application. For example, the user operation may be a tap operation or a slide operation performed on a display, a voice, a gesture/facial expression/body posture, a slide operation including a signature, a button pressing operation, or an operation of shaking the electronic device 100.

The operation that the user operation requests the electronic device 100 to perform includes an access operation performed on a resource. The resource is one or more resources in the electronic device 100. The access operation may include, for example, one or more of reading, adding, deleting, writing, modifying, and execution. For determining of specific content of the resource and the access operation, refer to the foregoing related descriptions. Resources in the electronic device may include a software resource, a hardware resource, a peripheral, a peripheral resource, or the like. For details, refer to the foregoing related descriptions.

In an embodiment of this application, a resource that a user requests to access in the electronic device 100 in S201 may be referred to as a third resource. The third resource may include one or more resources. This is not limited herein.

In a specific embodiment, the user operation is used to request to share some data in the electronic device 300 with the electronic device 100.

Figure 7A:
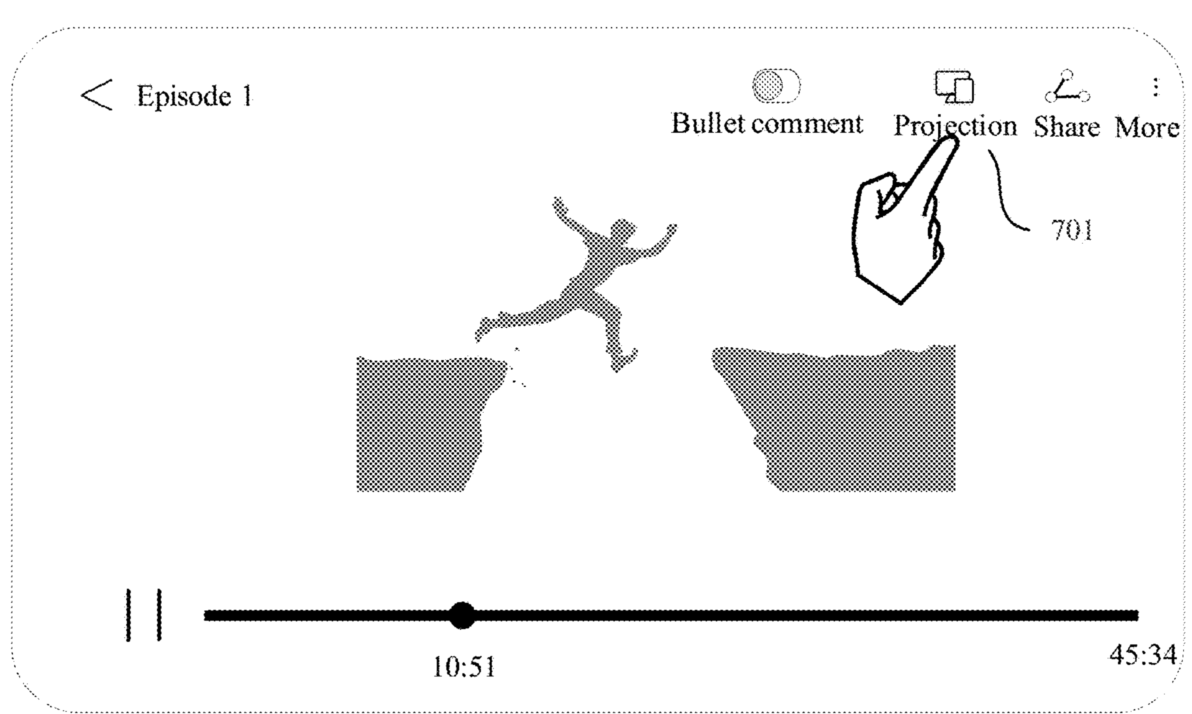
FIG. 7A to FIG. 7C show a group of user interfaces in a cross-device access control method.
Figure 7B:
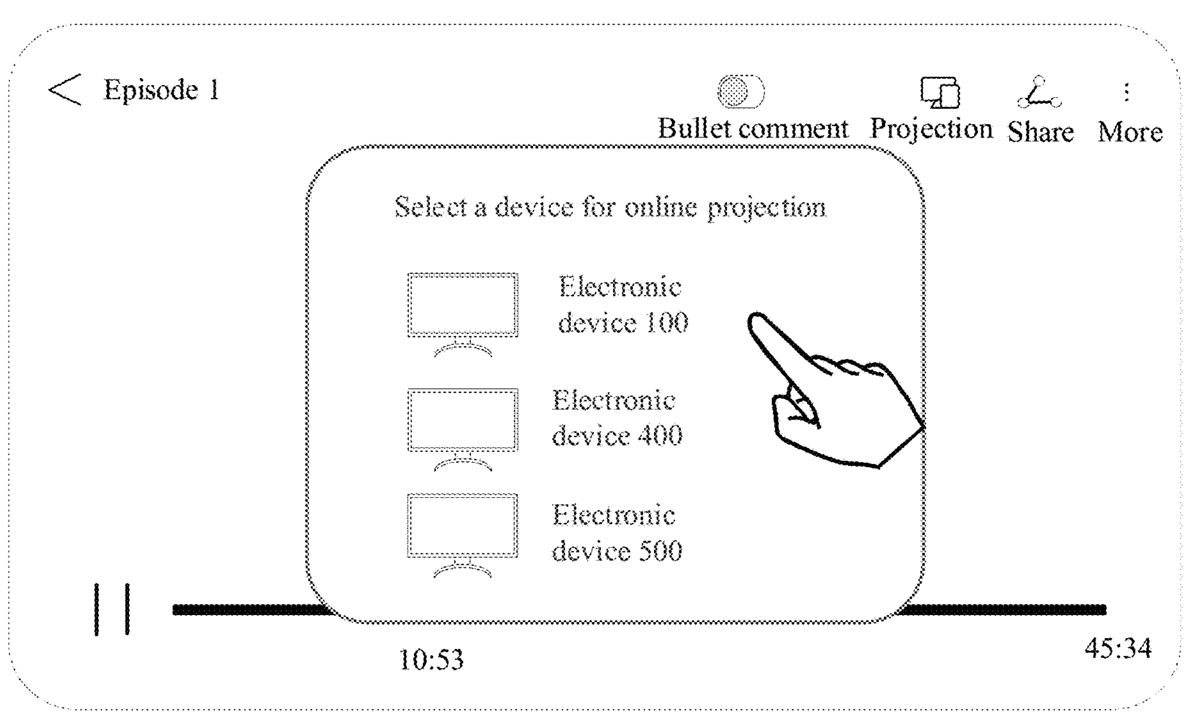

For example, FIG. 7A and FIG. 7B show a projection scenario.

FIG. 7A shows an example of a user interface 71 displayed when the electronic device 100 plays a network video selected by a user. The user interface 71 may be displayed by the electronic device 300 in response to an action performed by the user to switch the electronic device 300 from a portrait mode to a landscape mode, or displayed when the user taps a full-screen play control displayed in a lower right corner when the electronic device 300 plays a video.

As shown in FIG. 7A, the user interface 71 may further include a projection on/off control 701. The control 701 is configured to monitor a user operation (for example, a tap operation or a touch operation) of enabling/disabling a projection function of a video application.

Referring to FIG. 7A, the electronic device 300 may detect a user operation (for example, a tap operation or a touch operation) performed on the projection control 701, discover a nearby electronic device that supports projection, and display an identifier of the discovered electronic device.

FIG. 7B shows the identifier of the nearby electronic device supporting projection displayed by the electronic device 300. For example, as shown in FIG. 7B, the electronic device 300 may detect a user operation performed on an identifier corresponding to the electronic device 100.

In the examples in FIG. 7A and FIG. 7B, the user operation received by the electronic device 300 includes a user operation of tapping the control 701 first and then tapping the identifier of the electronic device 100. The user operation is used to request to project a video currently played by the electronic device 300 to the electronic device 100 for playing. The user operation requests to access a display, a speaker, a projection application, and the like of the electronic device 100.

In the examples in FIG. 7A and FIG. 7B, the electronic device 100 is selected by the user. In some other embodiments, the electronic device 100 may alternatively be selected by the electronic device 300 by default. For example, after receiving the user operation of tapping the control 701, the electronic device 300 may request, by default, to project the currently played video to a previously projected device (that is, the electronic device 100) for playing.

S202: The electronic device 300 generates a second operation instruction based on the user operation, where the second operation instruction is used to request the electronic device 100 to perform an operation.

The second operation instruction is the same as the user operation in S201 and is used to request to access the third resource in the electronic device 100.

A form of the second operation instruction is not limited in embodiments of this application. The second operation instruction may be, for example, a message sent through a wired connection or a wireless connection like a Bluetooth (BT) connection, a Wi-Fi P2P connection, an NFC connection, or a remote connection.

In the projection scenarios shown in FIG. 7A and FIG. 7B, the second operation instruction generated by the electronic device 300 may be a projection request, and the projection request is used to request to project a video currently played by the electronic device 300 to the electronic device 100 for playing.

S203: The electronic device 300 sends the second operation instruction to the electronic device 100.

S204: The electronic device 100 in a locked state receives the second operation instruction, and creates a limited execution environment based on the second operation instruction.

For a definition of the locked state, refer to the related descriptions in FIG. 4.

A definition and an obtaining manner of the second operation instruction are similar to those of the first operation instruction. For details, refer to the related descriptions in FIG. 4.

In an embodiment of this application, a policy for the electronic device 100 to create the limited execution environment based on the second operation instruction is not limited. For example, the electronic device 100 may create the limited execution environment based on a type of the second operation instruction. For example, when the second operation instruction is semantics carried in a voice, a gesture, a facial expression, a signature, and a body posture, quantities of operations that can be performed in limited execution environments separately created by the electronic device 100 decrease sequentially.

In some embodiments, the electronic device 100 may create the limited execution environment based on a risk level of an operation corresponding to the second operation instruction. Step S204 may specifically include the following steps S2041 to S2043.

S2041: Determine the risk level of the operation corresponding to the second operation instruction.

Herein, that the electronic device 100 determines the risk level of the operation corresponding to the second operation instruction is the same as that the electronic device 100 determines the risk level of the operation corresponding to the first operation instruction in S102 in FIG. 4. For details, refer to the related descriptions.

Step S2042: The electronic device 100 determines, based on the risk level of the operation corresponding to the second operation instruction, whether the operation corresponding to the second operation instruction is allowed to be performed.

Specifically, the electronic device wo presets operations that are allowed to be performed by the electronic device 100 in the case of risk levels of different operations. The setting may be preset by the user or a producer of the electronic device 100. A correspondence between a risk level of an operation and an operation that is allowed to be performed by the electronic device 100 is not limited in embodiments of this application.

If an execution result of S2042 is yes, the electronic device 100 continues to perform a subsequent step.

If an execution result of S2042 is no, the electronic device wo does not continue to perform a subsequent step.

In some embodiments, if the execution result of S2042 is no, the electronic device 100 may further output prompt information, where the prompt information may be used to prompt the user that the operation corresponding to the second operation instruction is not allowed to be performed currently.

In some embodiments, the prompt information may further prompt the user of a reason why the operation corresponding to the second operation instruction is not allowed to be performed currently. For example, the prompt information may include that the risk level of the operation corresponding to the second operation instruction is relatively high.

In some embodiments, the prompt information may further prompt the user of a solution. For example, the user is prompted to perform unlocking. This is not limited herein.

An implementation form of the prompt information is the same as an implementation form of prompt information in subsequent step S207. For details, refer to related descriptions in the subsequent step.

Step S2043: The electronic device 100 creates the limited execution environment based on the risk level of the operation corresponding to the second operation instruction.

A manner in which the electronic device 100 creates the limited execution environment based on the risk level of the operation corresponding to the second operation instruction is the same as the manner in which the electronic device 100 creates the limited execution environment based on the risk level of the operation corresponding to the first operation instruction in S1024 in FIG. 4. For details, refer to the related descriptions.

Figure 7C:
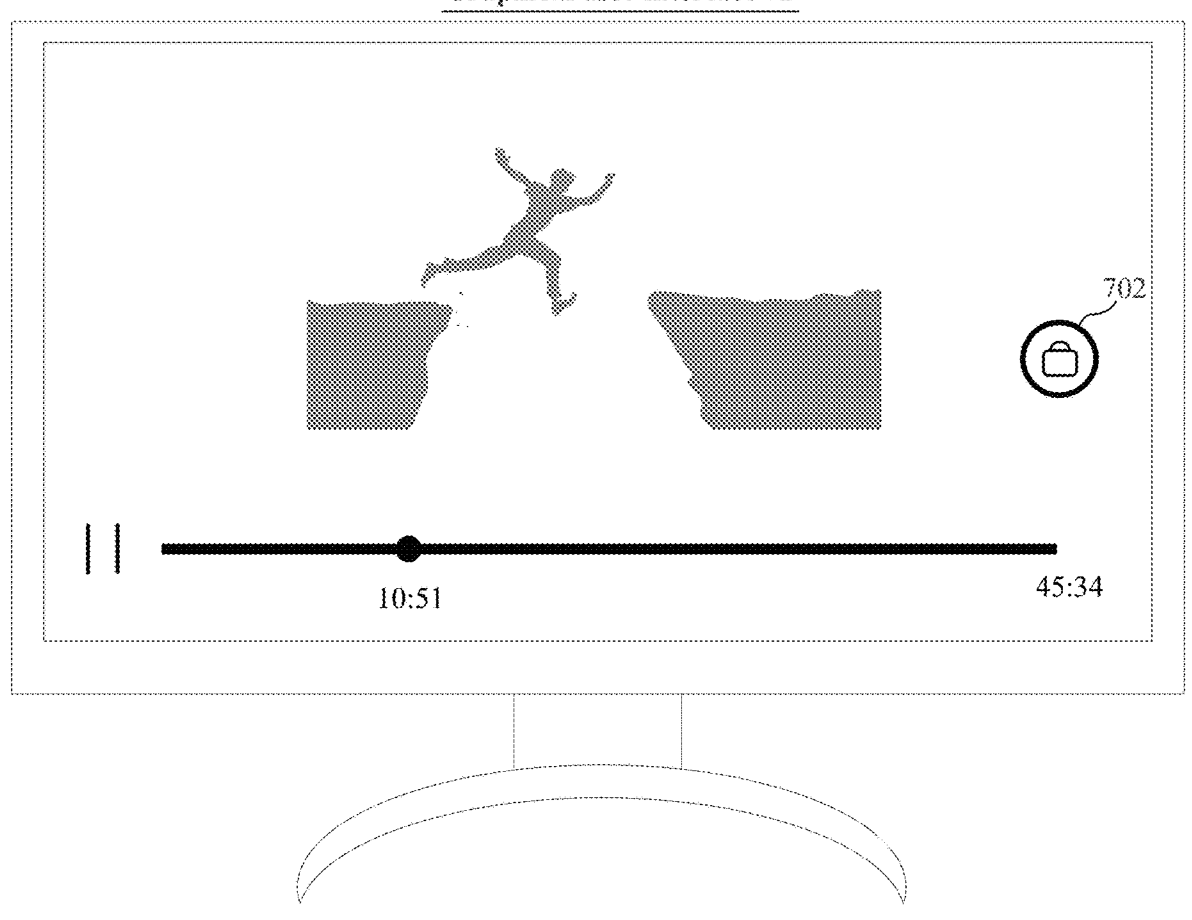

For example, FIG. 7C shows a user interface 72 displayed after the electronic device 100 creates the limited execution environment. As shown in FIG. 7C, the electronic device 100 is playing a video projected by the electronic device 300, and displays an unlocking control 702. A function of the unlocking control 702 is the same as that of the unlocking control 503 in FIG. 5E and FIG. 5F. For details, refer to the related descriptions. In an embodiment of this application, the unlocking control 702 may also be referred to as a first control.

S205: The electronic device 100 performs the operation corresponding to the second operation instruction in the created limited execution environment in response to the second operation instruction.

S205 is similar to S103 in FIG. 4. For details, refer to the related descriptions.

For optional steps S206 to S209, refer to the optional steps S104 to S107 in FIG. 4.

In S206, a resource that the user operation received by the electronic device 100 requests to access is referred to as a fourth resource. The fourth resource may include one or more resources. This is not limited herein.

In some embodiments of S209, the electronic device 100 may disable the limited execution environment after receiving an operation of closing a started application corresponding to the second operation instruction.

For example, if the electronic device 300 receives a user operation of stopping projection, the electronic device 300 may send indication information of stopping projection to the electronic device 100, and then the electronic device wo disables the limited execution environment.

According to the cross-device access control method shown in FIG. 6, the electronic device no longer determines, based on only whether the electronic device is unlocked, whether to respond to a user operation, but determines, based on a risk level of an operation instruction received by a cross-device, whether to respond to the user operation. In this way, finer-grained access control can be implemented, thereby enriching use scenarios and use scopes of the electronic device. For the user, the electronic device may be triggered to perform an operation other than the predefined operation in the locked state without performing complex authentication to unlock the electronic device, so that the user can control the electronic device more easily and conveniently. In addition, the electronic device no longer simply classifies resources into a resource accessible through a predefined operation and a resource accessible through another operation, and further implements fine-grained access control for various types of resources.

Particularly, for data sharing scenarios such as projection and multi-screen interaction, when one device shares data with another device, the another device does not need to be unlocked. In comparison with a solution in which the another device needs to be unlocked first each time data is shared, in an embodiment of this application, difficulty and complexity of projection and multi-screen interaction are reduced, and better user experience can be brought to the user.

In the access control methods provided in FIG. 4 and FIG. 6, the electronic device 100, the electronic device 200, and the electronic device 300 may be referred to as a first device, a second device, and a third device.

The weak authentication factor may also be referred to as a first authentication factor, and the strong authentication factor may also be referred to as a second authentication factor.

FIG. 8A is an architecture diagram of software of another electronic device 100 according to an embodiment of this application.

As shown in FIG. 8A, the electronic device 100 may include the following modules: an operation instruction identification module 801, a weak authentication factor identification module 802, and an access control and execution environment management module 803.

The operation instruction identification module 801 is configured to obtain a first operation instruction of the electronic device 100.

In some embodiments, the operation instruction identification module 801 may be configured to obtain the first operation instruction or a second operation instruction in the foregoing first manner. To be specific, the operation instruction identification module 801 may be configured to receive a user operation that carries the first/second operation instruction, and extract the first/second operation instruction from the user operation. In this case, the operation instruction identification module 801 may include the modules involved when the electronic device 100 obtains the first/second operation instruction in the foregoing first manner, for example, a voice assistant and a microphone.

In some embodiments, the operation instruction identification module 801 may be configured to obtain the first/second operation instruction in the foregoing second manner. To be specific, the operation instruction identification module 801 may be configured to receive indication information that is of a user operation and that is sent by another device to the electronic device 100, and extract the first/second operation instruction from the indication information of the user operation. In this case, the operation instruction identification module 801 may include the modules involved when the electronic device 100 obtains the first/second operation instruction in the foregoing second manner, for example, a wireless communication module, a wired communication module, and a voice assistant.

The operation instruction identification module 801 is further configured to determine an operation corresponding to the first/second operation instruction.

The weak authentication factor identification module 802 is configured to obtain a weak authentication factor of the electronic device 100.

In some embodiments, the weak authentication factor identification module 802 may be configured to obtain the weak authentication factor in the foregoing first manner. To be specific, the weak authentication factor identification module 802 may be configured to receive a user operation that carries the weak authentication factor, and extract the weak authentication factor from the user operation. In this case, the weak authentication factor identification module 802 may include the modules involved when the electronic device 100 obtains the weak authentication factor in the foregoing first manner, for example, a voice assistant, a microphone, a camera, and a fingerprint sensor.

In some embodiments, the weak authentication factor identification module 802 may be configured to obtain the weak authentication factor in the foregoing second manner. To be specific, the weak authentication factor identification module 802 may be configured to receive indication information that is of a user operation and that is sent by another device to the electronic device 100, and extract the weak authentication factor from the indication information of the user operation. In this case, the weak authentication factor identification module 802 may include the modules involved when the electronic device 100 obtains the weak authentication factor in the foregoing second manner, for example, a wireless communication module, a mobile communication module, and a voice assistant.

The weak authentication factor identification module 802 is further configured to determine a security level of the weak authentication factor. After obtaining the weak authentication factor of the electronic device 100, the weak authentication factor identification module 802 may further generate an authentication token. The authentication token indicates the security level of the weak authentication factor, and may further indicate an authentication mode, a valid time of the weak authentication factor, and the like.

Then, the operation instruction identification module 801 sends the operation corresponding to the first operation instruction and the weak authentication factor identification module 802 sends the authentication token to the access control and execution environment management module 803 separately. The authentication token may be used by the access control and execution environment management module 803 to verify validity.

In some embodiments, the access control and execution environment management module 803 is configured to determine, based on a security level of the operation corresponding to the first operation instruction and the security level of the weak authentication factor, whether the operation corresponding to the first operation instruction is allowed to be performed. In some embodiments, the access control and execution environment management module 803 is configured to determine, based on a security level of the operation corresponding to the second operation instruction, whether the operation corresponding to the second operation instruction is allowed to be performed. If a determining result is yes, the access control and execution environment management module 803 is configured to create a limited execution environment, and perform the operation corresponding to the first/second operation instruction in the limited execution environment. Herein, for a specific operation of creating the limited execution environment, refer to the related descriptions of the foregoing method embodiments.

In some embodiments, the electronic device 100 may further include a distributed scheduling module 804. The distributed scheduling module 804 is configured to obtain the first/second operation instruction in the foregoing third manner, or obtain the weak authentication factor in the foregoing third manner. In this case, the distributed scheduling module 804 may include a wireless communication module, a mobile communication module, and the like.

Figure 8B:
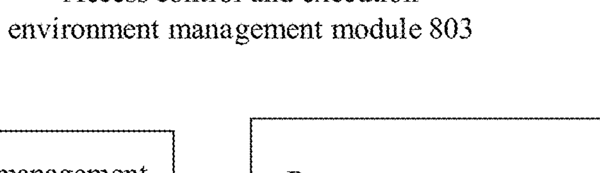

FIG. 8B shows an example of a structure of the access control and execution environment management module 803 of the electronic device.

As shown in FIG. 8B, the access control and execution environment management module 803 may include an access control module 8031, an execution environment management module 8032, a policy management module

8033, an application life cycle management module 8034, and a resource management module 8035.

The access control module 8031 is configured to transmit the operation corresponding to the first/second operation instruction, namely, information about a to-be-accessed resource, to the execution environment management module 8032.

The execution environment management module 8032 may be configured to determine whether the operation corresponding to the first/second operation instruction is allowed to be performed, and if yes, set an identifier of the limited execution environment, and configure a running policy of the limited execution environment in the policy management module 8033.

The policy management module 8033 is adapted to configure the running policy of the limited execution environment, that is, record operations that are allowed to be performed in the limited execution environment, or record specific access operations that are allowed to be performed on which resources or which type of resources.

The resource management module 8035 may include an application information management module, a data management module, and a permission management module.

The application information management module stores and manages information about all applications, and particularly records information about an application that is allowed for start or access in the current limited execution environment.

The data management module may be configured to perform classification and hierarchical management on data in the electronic device, and set a data level or category that is allowed for access in the limited execution environment. For example, the electronic device may classify various types of data based on features of the data, for example, may classify the data into data of different security levels.

The permission management module is configured to perform permission management on operations in the electronic device, and set permission allowed in the limited execution environment.

The application life cycle management module 8034 is configured to manage a life cycle of each application in the electronic device 100, for example, start or destroy. When the application life cycle management module 8034 is to start an application or access data in response to a user operation, the application life cycle management module 8034 first confirms with the application information management module whether the application is allowed to be started in the current limited execution environment, or confirms with the data management module whether the data is allowed for access in the current limited execution environment. If yes, the application may be started or the data may be accessed. After the application life cycle management module 8034 starts the application, if some operations are to be performed, the application life cycle management module 8034 needs to confirm with the permission management module whether the current limited execution environment has corresponding permission, and if yes, performs the operation.

The modules shown in FIG. 8A and FIG. 8B may be located at any one or more layers in the software system shown in FIG. 2. This is not limited herein.

The modules shown in FIG. 8A and FIG. 8B are merely examples. During specific implementation, the electronic device 100 may include more or fewer modules. This is not limited herein.

The implementations of this application may be randomly combined to achieve different technical effects.

All or some of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, like a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the procedures of the methods in embodiments may be implemented by a computer program instructing related hardware. The program may be stored in a computer-readable storage medium. When the program is run, the procedures of the methods in embodiments are performed. The foregoing storage medium includes any medium that can store program code, like a ROM, a random access memory RAM, a magnetic disk, or an optical disc.

In summary, the foregoing descriptions are merely embodiments of the technical solutions of this application, but is not intended to limit the protection scope of this application. Any modification, equivalent replacement, and improvement made in accordance with the disclosure of this application shall be included in the protection scope of this application.

What is claimed is:

1. A method, wherein the method comprises:

obtaining, by a first device in a locked state, a first operation instruction and a first authentication factor, wherein the first operation instruction requests to access a first resource of the first device, the first authentication factor comprises identity authentication information that does not meet an unlocking requirement of the first device, and identity authentication information that meets the unlocking requirement of the first device is used to switch the first device from the locked state to an unlocked state;

determining, by the first device based on the first operation instruction and the first authentication factor, resources that the first device is allowed to access; and based on that the resources that the first device is allowed to access comprise the first resource, accessing, by the first device while remaining in the locked state, the first resource in response to the first operation instruction, wherein the identity authentication information that does not meet the unlocking requirement in the first authentication factor is weaker than the identity authentication information that meets the unlocking requirement, and wherein the resources that the first device is allowed to access based on the identity authentication information that does not meet the unlocking requirement are fewer than resources that the first device is allowed to access after switching to the unlocked state based on the identity authentication information that meets the unlocking requirement.

2. The method according to claim 1, wherein the determining, by the first device based on the first operation instruction, the resources that the first device is allowed to access comprises:

determining, by the first device based on a risk level of accessing the first resource, the resources that the first device is allowed to access, wherein, based on that the risk level of accessing the first resource is higher, the first device is allowed to access fewer resources, and wherein based on that privacy of the first resource is higher, the risk level of accessing the first resource is higher.

3. The method according to claim 1, wherein the determining, by the first device based on the first authentication factor, the resources that the first device is allowed to access comprises:

determining, by the first device based on a security level of the first authentication factor, the resources that the first device is allowed to access, wherein, based on that the security level of the first authentication factor is lower, the first device is allowed to access fewer resources, and wherein based on that an authentication capability level (ACL) of an identity authentication mode corresponding to the first authentication factor is higher, or a matching degree between the first authentication factor and the identity authentication information that meets the unlocking requirement of the first device is higher, the security level of the first authentication factor is higher.

4. The method according to claim 1, wherein the first resource comprises a resource that is predefined as inaccessible to the first device in the locked state.

5. The method according to claim 1, wherein the first operation instruction comprises one of: semantics carried in a voice, a gesture, a facial expression, or a body posture.

6. The method according to claim 5, wherein the obtaining, by the first device, the first operation instruction comprises one of:

capturing, by the first device, the voice or an image, and identifying the first operation instruction carried in the voice or the image;

receiving, by the first device, a second voice or a second image sent by a second device, and identifying the first operation instruction carried in the second voice or the second image; or receiving, by the first device, the first operation instruction sent by the second device.

7. The method according to claim 1, wherein the identity authentication information that does not meet the unlocking requirement comprises one or more of: a password, a graph, or a biometric feature.

8. The method according to claim 1, wherein the identity authentication information that does not meet the unlocking requirement of the first device comprises: identity authentication information that is lower than a first standard required by a first authentication mode, or identity authentication information that meets a second standard required by a second authentication mode, wherein the first authentication mode is used to switch the first device from the locked state to the unlocked state, and the second authentication mode is different from the first authentication mode.

9. The method according to claim 1, wherein the obtaining, by the first device, the first authentication factor comprises one:

capturing, by the first device, a voice or an image, and identifying the first authentication factor carried in the voice or the image;

receiving, by the first device, a second voice or a second image sent by a second device, and identifying the first authentication factor carried in the second voice or the second image; or receiving, by the first device, the first authentication factor sent by the second device.

10. The method according to claim 1, wherein the obtaining, by the first device, the first operation instruction and the first authentication factor comprises one of:

capturing, by the first device, a voice, identifying semantics in the voice, and determining the semantics as the first operation instruction, identifying a voiceprint carried in the voice, and determining the voiceprint as the first authentication factor; or capturing, by the first device, an image, identifying at least one of a gesture, a facial expression, or a body posture in the image, determining the at least one of the gesture, the facial expression, or the body posture in the image as the first operation instruction, identifying a biometric feature carried in the image, and determining the biometric feature as the first authentication factor.

11. The method according to claim 1, wherein after the accessing, by the first device, the first resource in response to the first operation instruction, the method further comprises:

receiving, by the first device, a user operation, wherein the user operation requests to access a second resource of the first device; and based on that the resources that the first device is allowed to access comprise the second resource, accessing, by the first device, the second resource in response to the user operation; or based on that the resources that the first device is allowed to access do not comprise the second resource, refusing, by the first device, to respond to the user operation.

12. The method according to claim 1, wherein after the accessing, by the first device, the first resource in response to the first operation instruction, the method further comprises:

obtaining, by the first device, a second authentication factor, wherein the second authentication factor comprises the identity authentication information that meets the unlocking requirement of the first device, or the second authentication factor comprises a predefined quantity of first authentication factors; and switching, by the first device, from the locked state to the unlocked state based on the second authentication factor.

13. The method according to claim 1, wherein after the determining, by the first device, the resources that the first device is allowed to access, the method further comprises:

creating, by the first device, a limited execution environment, wherein in the limited execution environment, the first device is allowed to access the resources that are determined as allowed for access, and wherein the accessing, by the first device, the first resource in response to the first operation instruction comprises:

accessing, by the first device, the first resource in the limited execution environment in response to the first operation instruction.

14. A first device, comprising:

a memory and one or more processors, wherein the memory is coupled to the one or more processors, the memory is configured to store computer program code, the computer program code comprises computer instructions, and the one or more processors invoke the computer instructions to enable the first device to perform:

obtaining, by the first device in a locked state, a first operation instruction and a first authentication factor, wherein the first operation instruction requests to access a first resource of the first device, the first authentication factor comprises identity authentication information that does not meet an unlocking requirement of the first device, and identity authentication information that meets the unlocking requirement of the first device is used to switch the first device from the locked state to an unlocked state;

determining, by the first device based on the first operation instruction and the first authentication factor, resources that the first device is allowed to access; and based on that the resources that the first device is allowed to access comprise the first resource, accessing, by the first device while remaining in the locked state, the first resource in response to the first operation instruction, wherein the identity authentication information that does not meet the unlocking requirement in the first authentication factor is weaker than the identity authentication information that meets the unlocking requirement, and wherein the resources that the first device is allowed to access based on the identity authentication information that does not meet the unlocking requirement are fewer than resources that the first device is allowed to access after switching to the unlocked state based on the identity authentication information that meets the unlocking requirement.

15. The first device according to claim 14, wherein the determining, by the first device based on the first operation instruction, the resources that the first device is allowed to access comprises:

determining, by the first device based on a risk level of accessing the first resource, the resources that the first device is allowed to access, wherein based on that the risk level of accessing the first resource is higher, the first device is allowed to access fewer resources, and wherein based on that privacy of the first resource is higher, the risk level of accessing the first resource is higher.

16. A non-transitory computer-readable medium having instructions stored thereon that, when executed by a first device, cause the first device to perform operations, the operations comprising:

obtaining, by the first device in a locked state, a first operation instruction and a first authentication factor, wherein the first operation instruction requests to access a first resource of the first device, the first authentication factor comprises identity authentication information that does not meet an unlocking requirement of the first device, and identity authentication information that meets the unlocking requirement of the first device is used to switch the first device from the locked state to an unlocked state;

determining, by the first device based on the first operation instruction and the first authentication factor, resources that the first device is allowed to access; and based on that the resources that the first device is allowed to access comprise the first resource, accessing, by the first device while remaining in the locked state, the first resource in response to the first operation instruction, wherein the identity authentication information that does not meet the unlocking requirement in the first authentication factor is weaker than the identity authentication information that meets the unlocking requirement, and wherein the resources that the first device is allowed to access based on the identity authentication information that does not meet the unlocking requirement are fewer than resources that the first device is allowed to access after switching to the unlocked state based on the identity authentication information that meets the unlocking requirement.

17. The non-transitory computer-readable medium according to claim 16, wherein the determining, by the first device based on the first operation instruction, the resources that the first device is allowed to access comprises:

determining, by the first device based on a risk level of accessing the first resource, the resources that the first device is allowed to access, wherein, based on that the risk level of accessing the first resource is higher, the first device is allowed to access fewer resources, and wherein based on that privacy of the first resource is higher, the risk level of accessing the first resource is higher.

18. The non-transitory computer-readable medium according to claim 16, wherein the determining, by the first device based on the first authentication factor, the resources that the first device is allowed to access comprises:

determining, by the first device based on a security level of the first authentication factor, the resources that the first device is allowed to access, wherein, based on that the security level of the first authentication factor is lower, the first device is allowed to access fewer resources, and wherein based on that an authentication capability level (ACL) of an identity authentication mode corresponding to the first authentication factor is higher, or a matching degree between the first authentication factor and the identity authentication information that meets the unlocking requirement of the first device is higher, the security level of the first authentication factor is higher.

19. The non-transitory computer-readable medium according to claim 16, wherein the first resource comprises a resource that is predefined as inaccessible to the first device in the locked state.

20. The non-transitory computer-readable medium according to claim 16, wherein the first operation instruction comprises one of: semantics carried in a voice, a gesture, a facial expression, or a body posture.

* * * * *